United States Patent
Kim et al.

(10) Patent No.: US 9,794,046 B2
(45) Date of Patent: Oct. 17, 2017

(54) METHOD FOR TRANSMITTING UPLINK CONTROL INFORMATION IN WIRELESS ACCESS SYSTEM AND APPARATUS THEREFOR

(71) Applicant: LG ELECTRONICS INC., Seoul (KR)

(72) Inventors: Bonghoe Kim, Seoul (KR); Dongyoun Seo, Seoul (KR); Suckchel Yang, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 8 days.

(21) Appl. No.: 14/779,205

(22) PCT Filed: Apr. 4, 2014

(86) PCT No.: PCT/KR2014/002925
§ 371 (c)(1),
(2) Date: Sep. 22, 2015

(87) PCT Pub. No.: WO2014/163429
PCT Pub. Date: Oct. 9, 2014

(65) Prior Publication Data
US 2016/0065345 A1  Mar. 3, 2016

Related U.S. Application Data

(60) Provisional application No. 61/808,639, filed on Apr. 5, 2014, provisional application No. 61/809,879, filed on
(Continued)

(51) Int. Cl.
*H04L 5/00* (2006.01)
*H04W 72/04* (2009.01)

(52) U.S. Cl.
CPC .......... *H04L 5/0055* (2013.01); *H04L 5/0035* (2013.01); *H04L 5/0094* (2013.01);
(Continued)

(58) Field of Classification Search
None
See application file for complete search history.

(56) References Cited

U.S. PATENT DOCUMENTS

2011/0207487 A1* 8/2011 Yang ................. H04W 4/18
455/507
2011/0300872 A1* 12/2011 Lim ................. H04W 36/18
455/450

(Continued)

OTHER PUBLICATIONS

NTT DoCoMo, Inc., "Necessity of C-Plane Architecture Enhancements for Dual Connectivity," 3GPP TSG-RAN2# 81, Jan. 28-Feb. 1, 2013, 4 pages, R2-130488.
(Continued)

*Primary Examiner* — Phuc Tran
*Assistant Examiner* — Soon-Dong D Hyun
(74) *Attorney, Agent, or Firm* — Birch, Stewart, Kolasch & Birch, LLP

(57) ABSTRACT

The present invention provides a method for transmitting uplink control information (UCI) in a wireless access system supporting a multi-connection mode for a terminal to be connected to at least two small cells, and an apparatus therefor. In a wireless access system supporting a multi-connection mode, a method for enabling a terminal to transmit a confirmation response signal (ACK/NACK) according to an embodiment of the present invention includes the steps of: receiving an upper layer signal containing resource allotment information representing an allotted resource region in order to transmit a confirmation response signal; receiving a first physical downlink sharing channel (PDSCH) signal from a first small cell; receiving a
(Continued)

second PDSCH signal from a second small cell; and transmitting a single confirmation response signal for the first PDSCH signal and the second PDSCH signal through the resource region represented by the resource allotment information. Here, the terminal maintains a plurality of connections with two or more small cells in the multi-connection mode, and the resource region may be allotted for the same time and frequency resource in both the first small cell and the second small cell.

14 Claims, 18 Drawing Sheets

Related U.S. Application Data on Apr. 9, 2013, provisional application No. 61/819,651, filed on May 6, 2013.

(52) U.S. Cl.
CPC ..... *H04W 72/044* (2013.01); *H04W 72/0406* (2013.01); *H04L 5/001* (2013.01); *H04L 5/0023* (2013.01)

(56) References Cited

U.S. PATENT DOCUMENTS

| | | | |
|---|---|---|---|
| 2012/0176965 A1* | 7/2012 | Zhu | H04B 7/0689 370/328 |
| 2013/0070689 A1 | 3/2013 | Liu et al. | |
| 2013/0083742 A1 | 4/2013 | Baldemair et al. | |
| 2013/0136074 A1* | 5/2013 | Okino | H04W 24/00 370/329 |
| 2013/0155914 A1* | 6/2013 | Wang | H04L 5/001 370/280 |
| 2013/0235756 A1* | 9/2013 | Seo | H04L 1/0026 370/252 |
| 2013/0344909 A1* | 12/2013 | Davydov | H04B 7/0689 455/501 |
| 2014/0233407 A1* | 8/2014 | Pourahmadi | H04L 5/0007 370/252 |

OTHER PUBLICATIONS

Pantech, "Challenge on UL Transmission of Dual Connectivity," 3GPP TSG-RAN WG2 Meeting #83, Aug. 19-23, 2013, pp. 1-8, R2-132504.

Huawei et al., "Potential technologies for small cell enhancement—physical layer support of higher-layer aspects," 3GPP TSG RAN WG1 Meeting #72, Jan. 28-Feb. 1, 2013, 2 pages, R1-130025.

NTT DoCoMo, "Physical Layer Design for Dual Connectivity," 3GPP TSG RAN WG1 Meeting #72, Jan. 28-Feb. 1, 2013, pp. 1-3, R1-130409.

NTT DoCoMo, Inc., "Deployment scenarios and design goals for dual connectivity," 3GPP TSG-RAN WG2 #81, Jan. 28-Feb. 1, 2013, pp. 1-6, R2-130444.

Qualcomm Incorporated, "Air interface considerations for dual connectivity," 3GPP TSG-RAN2#81, Jan. 28-Feb. 1, 2013, pp. 1-3, R2-130266.

* cited by examiner

FIG. 4
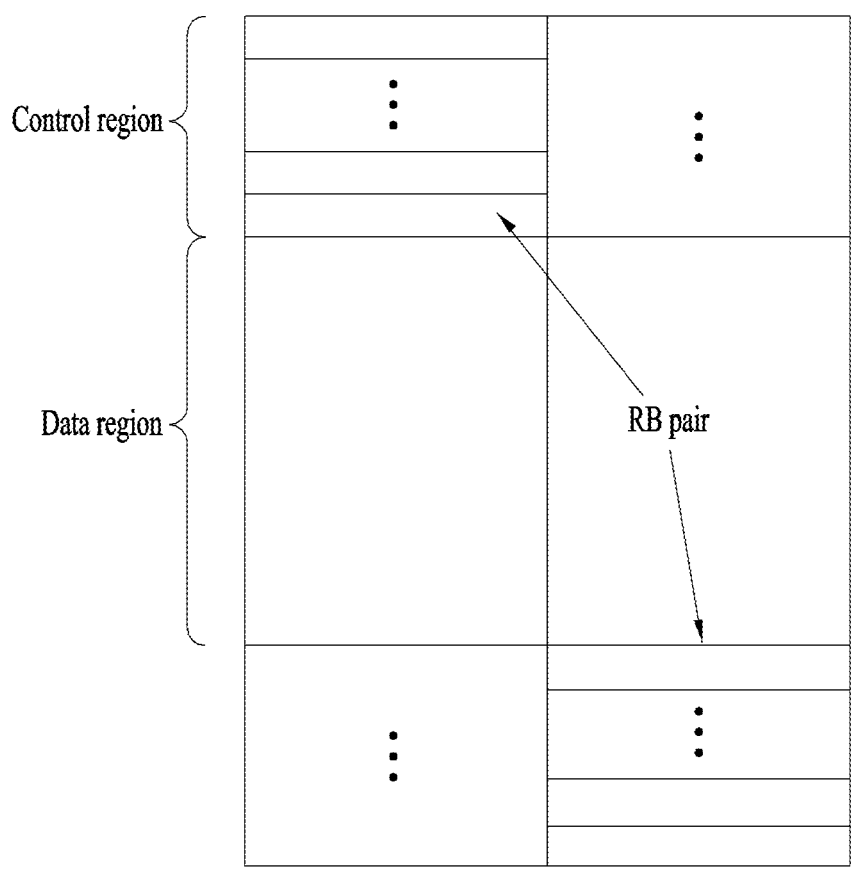
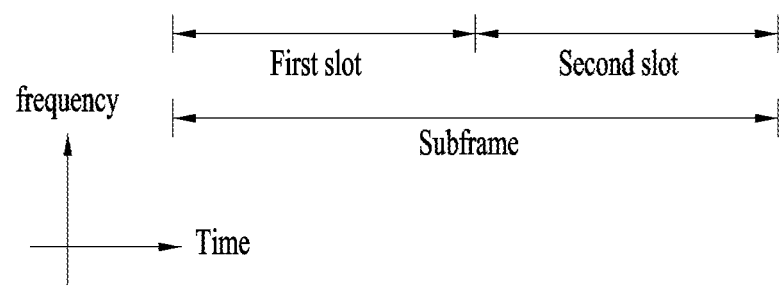

PUCCH format 1a and 1b structure (Normal CP case)

PUCCH format 1a and 1b structure (Extended CP case)

PUCCH format 2,2a and 2b structure (Normal CP case)

PUCCH format 2,2a and 2b structure (Extended CP case)

FIG. 10

Resource allocation: 18 ACK/NACK channels with normal CP $\Delta_{shift}^{PUCCH} = 2$

| Cell specific cyclic shift offset | | RS orthogonal cover | | | ACK/NACK orthogonal cover | | |
|---|---|---|---|---|---|---|---|
| $\delta_{offset}^{PUCCH} = 1$ | $\delta_{offset}^{PUCCH} = 0$ | $\bar{n}_{OC} = 0$ | $\bar{n}_{OC} = 1$ | $\bar{n}_{OC} = 2$ | $n_{OC} = 0$ | $n_{OC} = 1$ | $n_{OC} = 2$ |
| $n_{CS} = 1$ | $n_{CS} = 0$ | $n' = 0$ | | 12 | $n' = 0$ | | 12 |
| 2 | 1 | | 6 | | | 6 | 13 |
| 3 | 2 | 1 | | 13 | 1 | | |
| 4 | 3 | | 7 | | | 7 | 14 |
| 5 | 4 | 2 | | 14 | 2 | | |
| 6 | 5 | | 8 | | | 8 | 15 |
| 7 | 6 | 3 | | 15 | 3 | | |
| 8 | 7 | | 9 | | | 9 | 16 |
| 9 | 8 | 4 | | 16 | 4 | | |
| 10 | 9 | | 10 | | | 10 | 17 |
| 11 | 10 | 5 | | 17 | 5 | | |
| 0 | 11 | | 11 | | | 11 | |

$\Delta_{shift}^{PUCCH} \in \{1,2,3\}$ for normal cyclic prefix
$\{1,2,3\}$ for extended cyclic prefix $\delta_{offset}^{PUCCH} \in \{0,1,...,\Delta_{shift}^{PUCCH} - 1\}$ Cell specific cyclic shift offset $n_{OC}$    Orthogonal sequence index for ACK/NACK
$\bar{n}_{OC}$    Orthogonal sequence index for RS
$n_{CS}$    Cyclic shift value of a CAZAC sequence
$n'$    ACK/NACK resource index used for the channelization in a RB

FIG. 11

METHOD FOR TRANSMITTING UPLINK CONTROL INFORMATION IN WIRELESS ACCESS SYSTEM AND APPARATUS THEREFOR

CROSS REFERENCE TO RELATED APPLICATIONS

This application is the National Phase of PCT International Application No. PCT/KR2014/002925, filed on Apr. 4, 2014, which claims priority under 35 U.S.C. 119(e) to U.S. Provisional Application No. 61/808,639, filed on Apr. 5, 2013, U.S. Provisional Application No. 61/809,879, filed on Apr. 9, 2013, and U.S. Provisional Application No. 61/819,651, filed on May 6, 2013, all of which are hereby expressly incorporated by reference into the present application.

TECHNICAL FIELD

The present invention relates to a radio access system and, more particularly, to a method for transmitting channel status information (CSI) in an environment, in which a user equipment (UE) is connected to two or more small cells, and a device supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

Recently, the structure of a radio access system has changed to a structure in which small cells (e.g., pico cells, femto cells, etc.) having various shapes and small sizes are connected to a macro cell having a relatively large size. This aims to enable a user equipment (UE), which is an end user, to receive a high data rate to increase quality of experience in a state in which multilayered cells having vertical layers, in which conventional macro cells are fundamentally involved, are mixed.

However, in an environment in which a large number of small cells is arranged, a UE may be connected to two or more small cells to transmit and receive data. At this time, the UE shall transmit control information of several small cells using a restricted uplink control channel. Accordingly, there is a need to transmit uplink control information using a method different from that of a legacy cellular system.

DISCLOSURE

Technical Problem

An object of the present invention devised to solve the problem lies in methods for transmitting uplink control information (UCI).

Another object of the present invention devised to solve the problem lies in methods for transmitting acknowledgement/negative-acknowledgement (ACK/NACK) information of UCI in a small cell environment.

Another object of the present invention devised to solve the problem lies in devices supporting such methods.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

The present invention provides methods for transmitting channel status information (CSI) in an environment, in which a user equipment (UE) is connected to two or more small cells, and devices supporting the same.

The object of the present invention can be achieved by providing a method for transmitting an acknowledgement/negative-acknowledgement (ACK/NACK) signal at a user equipment (UE) in a radio access system supporting a multi-connectivity mode including receiving a higher layer signal including resource allocation information indicating a resource region allocated in order for the UE in the multi-connectivity mode to transmit the ACK/NACK signal, receiving a first physical downlink shared channel (PDSCH) signal from a first small cell, receiving a second PDSCH signal from a second small cell, and transmitting one ACK/NACK signal for the first PDSCH signal and the second PDSCH signal via the resource region indicated by the resource allocation information. At this time, the UE may maintain connection with two or more small cells in the multi-connectivity mode, and the resource region may be allocated to the same time and frequency resources in the first small cell and the second small cell.

In another aspect of the present invention, provided herein is a user equipment (UE) for transmitting an acknowledgement/negative-acknowledgement (ACK/NACK) signal a in a radio access system supporting a multi-connectivity mode including a transmitter, a receiver and a processor connected to the transmitter and the receiver to support the multi-connectivity mode.

At this time, the processor may be configured to receive a higher layer signal including resource allocation information indicating a resource region allocated in order to transmit the ACK/NACK signal, to receive a first physical downlink shared channel (PDSCH) signal from a first small cell and to receive a second PDSCH signal from a second small cell, using the receiver, and transmit one ACK/NACK signal for the first PDSCH signal and the second PDSCH signal via the resource region indicated by the resource allocation information, using the transmitter. At this time, the UE may maintain connection with two or more small cells in the multi-connectivity mode, and the resource region may be allocated to the same time and frequency resources in the first small cell and the second small cell.

In the above aspects, the first small cell and the second small cell may be arranged at different physical positions and are connected to each other via a non-ideal backhaul link.

In addition, the ACK/NACK signal may be configured by using physical uplink control channel (PUCCH) format 1b. At this time, the ACK/NACK signal may be combined with a location of the resource region to indicate a result of receiving the first PDSCH signal and the second PDSCH signal.

Alternatively, the ACK/NACK signal may be configured by using physical uplink control channel (PUCCH) format 3. At this time, the UE may further transmit a scheduling request (SR) information of one or more of the first small cell and the second small cell via PUCCH format 3.

At this time, the UE may configure PUCCH format 3 by concatenating ACK/NACK information of the first PDSCH signal, ACK/NACK information of the second PDSCH signal, SR information of the first small cell and SR information of the second small cell in a fixed order.

It is to be understood that both the foregoing general description and the following detailed description of the present invention are exemplary and explanatory and are intended to provide further explanation of the invention as claimed.

Advantageous Effects

According to the embodiments of the present invention, it is possible to efficiently transmit uplink control information (UCI) in a multi-connectivity mode in which a UE is connected to a plurality of small cells.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

DESCRIPTION OF DRAWINGS

The accompanying drawings, which are included to provide a further understanding of the invention, illustrate embodiments of the invention and together with the description serve to explain the principle of the invention.

FIG. 4 is a diagram illustrating a structure of an uplink subframe according to the embodiments.

FIG. 10 illustrates ACK/NACK channelization for PUCCH formats 1a and 1b.

FIG. 11 illustrates channelization for a hybrid structure of PUCCH format 1a/1b and format 2/2a/2b in the same PRB.

BEST MODE

Figure 1:
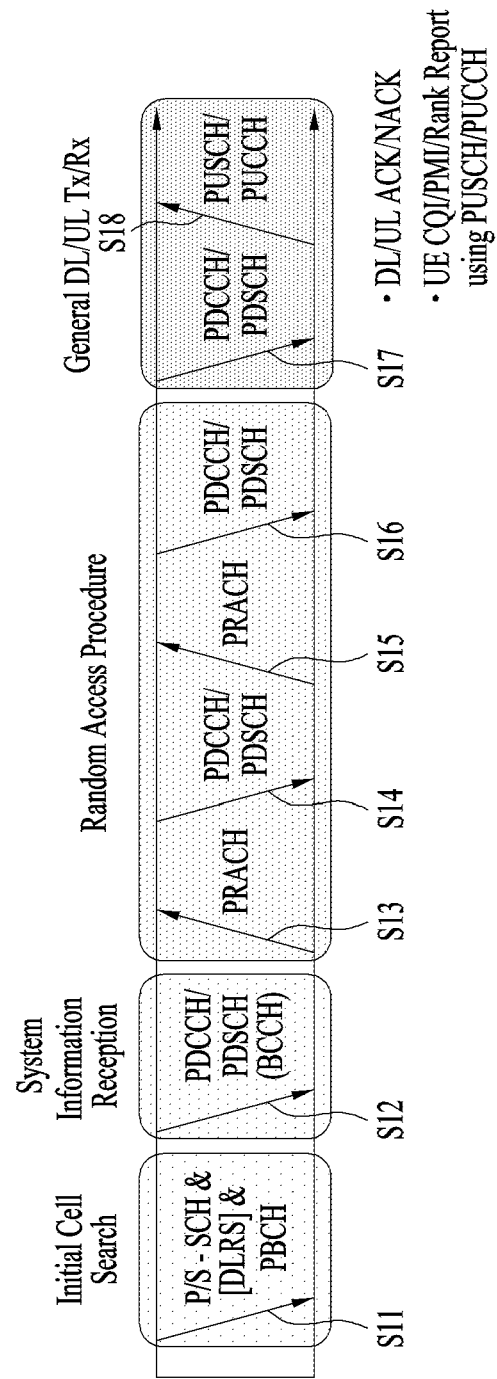
FIG. 1 is a conceptual diagram illustrating physical channels used in the embodiments and a signal transmission method using the physical channels.

The following embodiments of the present invention provide methods for transmitting uplink control information (UCI) in a radio access system supporting a multi-connectivity mode, in which a user equipment (UE) is connected to two or more small cells, and devices supporting the same.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present invention (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on an UpLink (UL). Likewise, the UE may serve as a receiver and the BS may serve as a transmitter, on a DownLink (DL).

The embodiments of the present disclosure may be supported by standard specifications disclosed for at least one of wireless access systems including an Institute of Electrical and Electronics Engineers (IEEE) 802.xx system, a $3^{rd}$ Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the invention.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term used in embodiments of the present disclosure, a data block is interchangeable with a transport block in the same meaning. In addition, the MCS/TBS index table used in the LTE/LTE-A system can be defined as a first table or a legacy table, and the MCS/TBS index table which is used for supporting the 256QAM can be defined as a second table or a new table.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
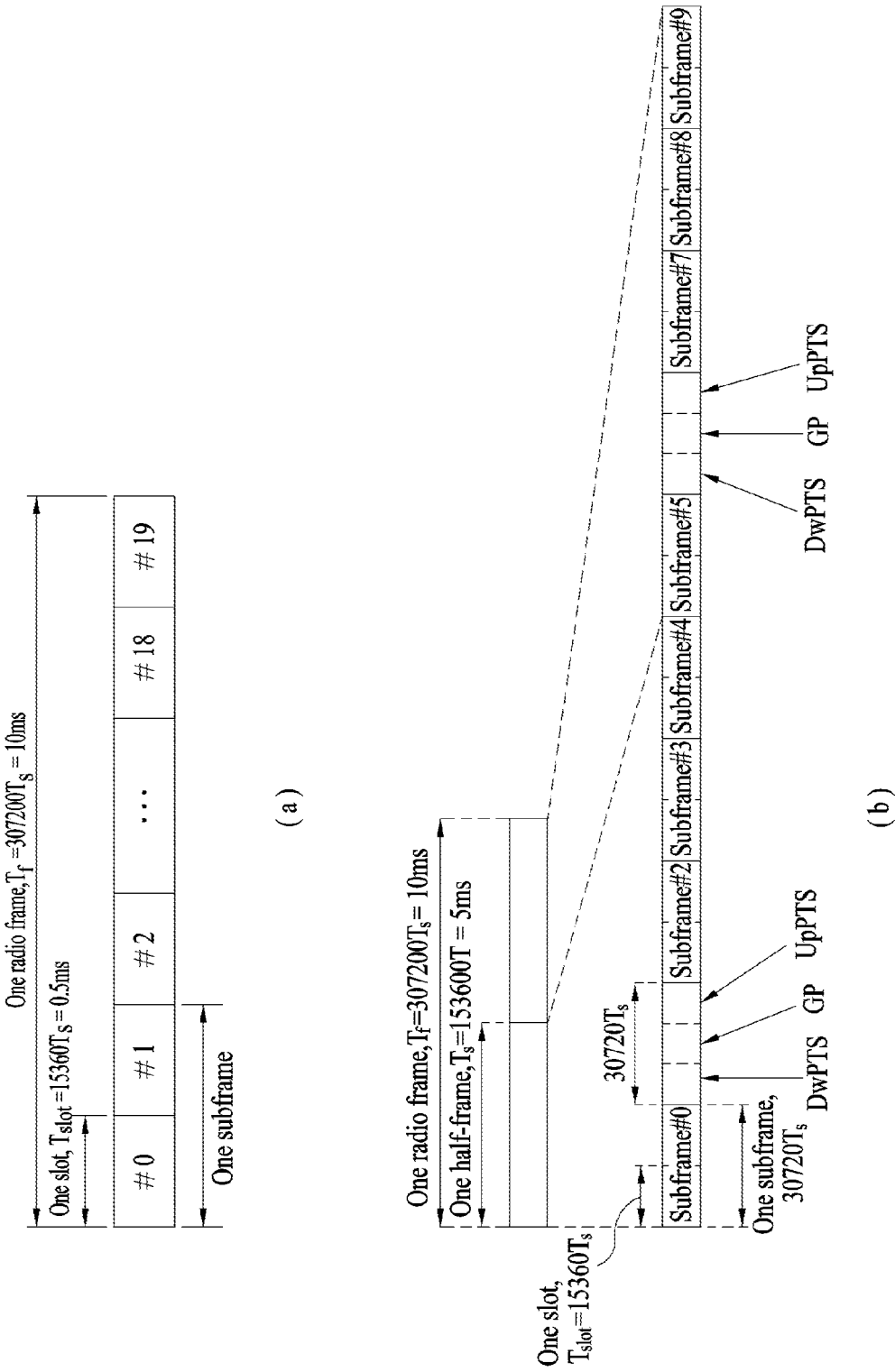
FIG. 2 is a diagram illustrating a structure of a radio frame for use in the embodiments.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms ($T_f = 307200 \cdot T_s$) long, including equal-sized 20 slots indexed from 0 to 19. Each slot is 0.5 ms ($T_{slot}=15360 \cdot T_s$) long. One subframe includes two successive slots. An $i^{th}$ subframe includes $2i^{th}$ and $(2i+1)^{th}$ slots. That is, a radio frame includes 10 subframes. A time required for transmitting one subframe is defined as a Transmission Time Interval (TTI). $T_s$ is a sampling time given as $T_s=1/(15 \text{ kHz} \times 2048)=3.2552\times 10^{-8}$ (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms ($T_f=307200 \cdot T_s$) long, including two half-frames each having a length of 5 ms ($=153600 \cdot T_s$) long. Each half-frame includes five subframes each being 1 ms ($=30720 \cdot T_s$) long. An $i^{th}$ subframe includes $2i^{th}$ and $(2i+1)^{th}$ slots each having a length of 0.5 ms ($T_{slot}=15360 \cdot T_s$). $T_s$ is a sampling time given as $T_s=1/(15 \text{ kHz} \times 2048)=3.2552\times 10^{-8}$ (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

Figure 3:
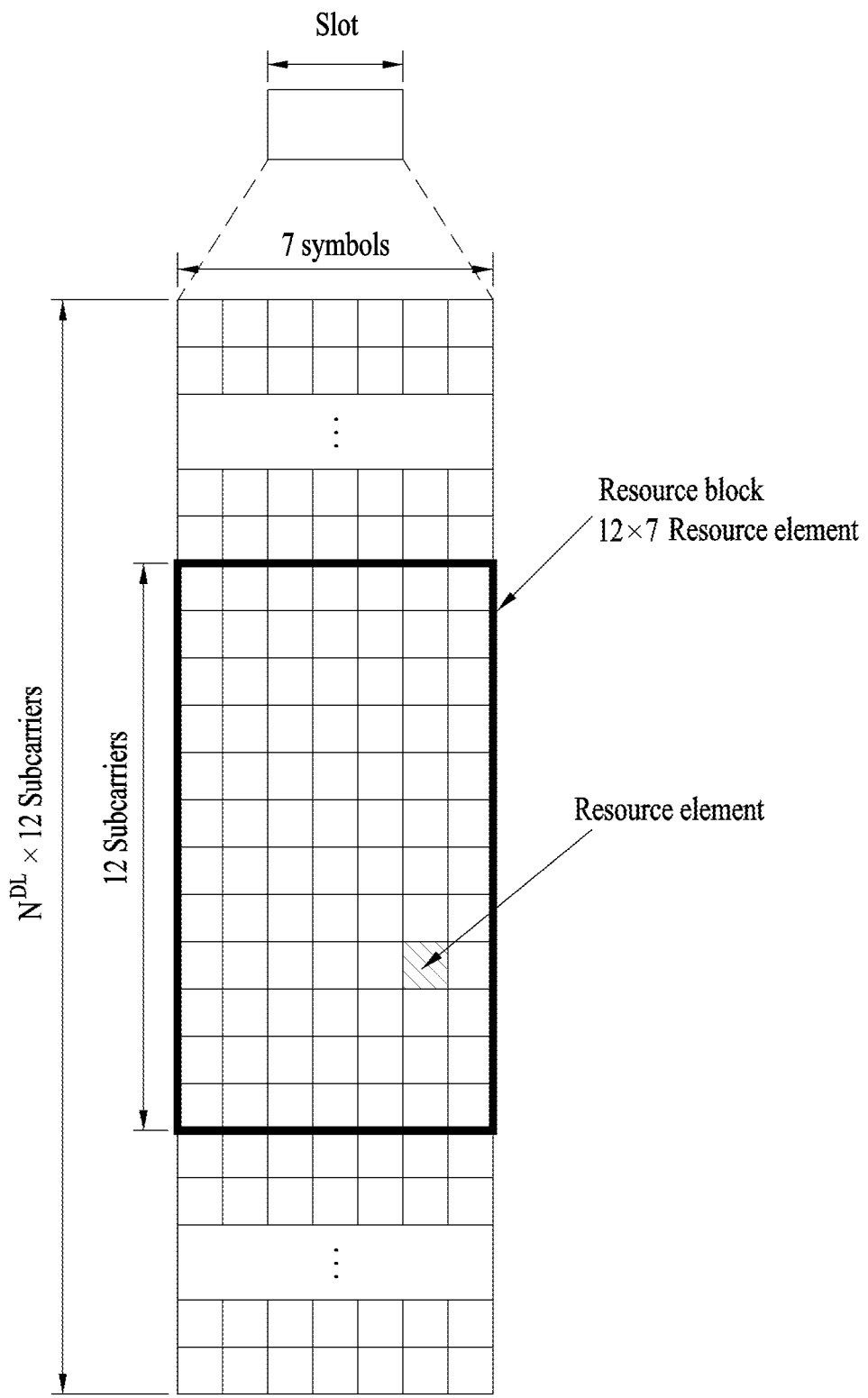
FIG. 3 is a diagram illustrating an example of a resource grid of a downlink slot according to the embodiments.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, $N_{DL}$ depends on a DL transmission bandwidth. A UL slot may have the same structure as a DL slot.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
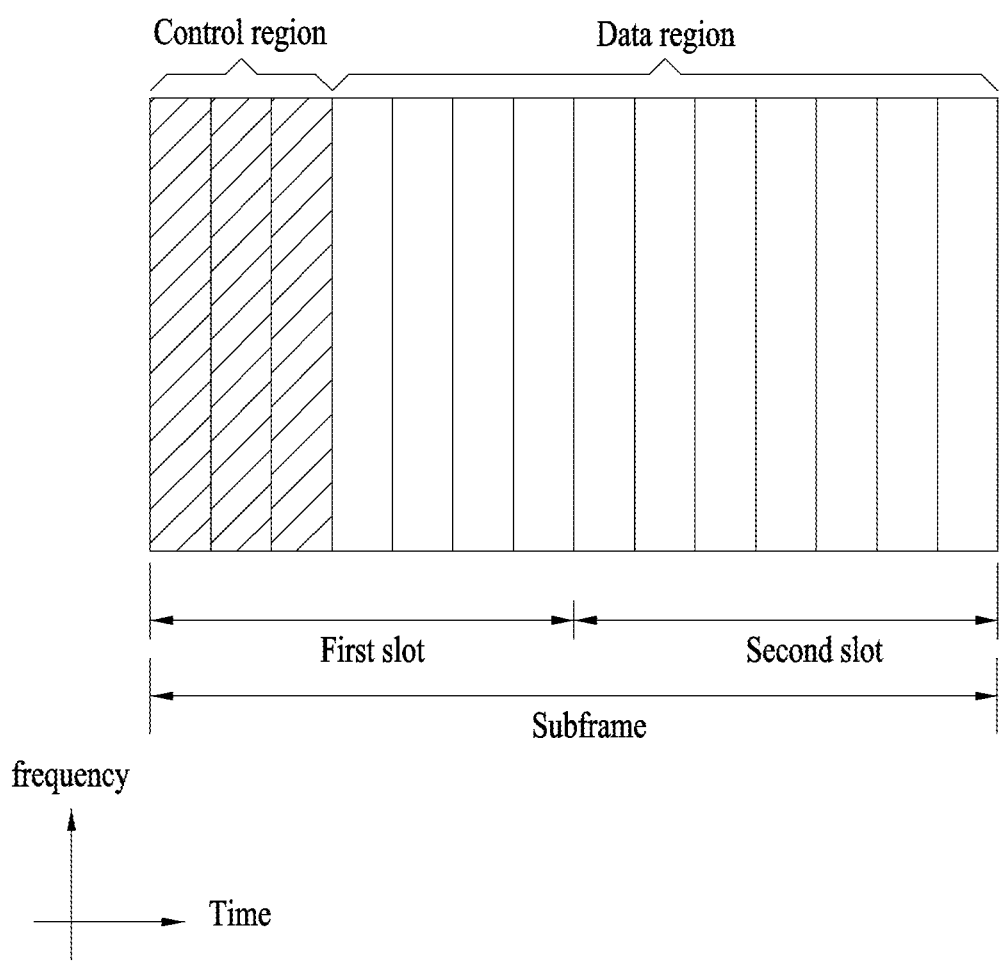
FIG. 5 is a diagram illustrating a structure of a downlink subframe according to the embodiments.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_S$ | $2192 \cdot T_S$ | $2560 \cdot T_S$ | $7680 \cdot T_S$ | $2192 \cdot T_S$ | $2560 \cdot T_S$ |
| 1 | $19760 \cdot T_S$ | | | $20480 \cdot T_S$ | | |
| 2 | $21952 \cdot T_S$ | | | $23040 \cdot T_S$ | | |
| 3 | $24144 \cdot T_S$ | | | $25600 \cdot T_S$ | | |
| 4 | $26336 \cdot T_S$ | | | $7680 \cdot T_S$ | $4384 \cdot T_S$ | $5120 \cdot T_S$ |
| 5 | $6592 \cdot T_S$ | $4384 \cdot T_S$ | $5120 \cdot T_S$ | $20480 \cdot T_S$ | | |
| 6 | $19760 \cdot T_S$ | | | $23040 \cdot T_S$ | | |
| 7 | $21952 \cdot T_S$ | | | — | — | — |
| 8 | $24144 \cdot T_S$ | | | — | — | — |

1.2 Physical Downlink Control Channel (PDCCH)
1.2.1 PDCCH Overview

The PDCCH may deliver information about resource allocation and a transport format for a Downlink Shared Channel (DL-SCH) (i.e. a DL grant), information about resource allocation and a transport format for an Uplink Shared Channel (UL-SCH) (i.e. a UL grant), paging information of a Paging Channel (PCH), system information on the DL-SCH, information about resource allocation for a higher-layer control message such as a random access response transmitted on the PDSCH, a set of Tx power control commands for individual UEs of a UE group, Voice Over Internet Protocol (VoIP) activation indication information, etc.

A plurality of PDCCHs may be transmitted in the control region. A UE may monitor a plurality of PDCCHs. A PDCCH is transmitted in an aggregate of one or more consecutive Control Channel Elements (CCEs). A PDCCH made up of one or more consecutive CCEs may be transmitted in the control region after subblock interleaving. A CCE is a logical allocation unit used to provide a PDCCH at a code rate based on the state of a radio channel. A CCE includes a plurality of RE Groups (REGs). The format of a PDCCH and the number of available bits for the PDCCH are determined according to the relationship between the number of CCEs and a code rate provided by the CCEs.

1.2.2 PDCCH Structure

A plurality of PDCCHs for a plurality of UEs may be multiplexed and transmitted in the control region. A PDCCH is made up of an aggregate of one or more consecutive CCEs. A CCE is a unit of 9 REGs each REG including 4 REs. Four Quadrature Phase Shift Keying (QPSK) symbols are mapped to each REG. REs occupied by RSs are excluded from REGs. That is, the total number of REGs in an OFDM symbol may be changed depending on the presence or absence of a cell-specific RS. The concept of an REG to which four REs are mapped is also applicable to other DL control channels (e.g. the PCFICH or the PHICH). Let the number of REGs that are not allocated to the PCFICH or the PHICH be denoted by $N_{REG}$. Then the number of CCEs available to the system is $N_{CCE}$ ($=\lfloor N_{REG}/9 \rfloor$) and the CCEs are indexed from 0 to $N_{CCE}-1$.

To simplify the decoding process of a UE, a PDCCH format including n CCEs may start with a CCE having an index equal to a multiple of n. That is, given CCE i, the PDCCH format may start with a CCE satisfying i mod n=0.

The eNB may configure a PDCCH with 1, 2, 4, or 8 CCEs. {1, 2, 4, 8} are called CCE aggregation levels. The number of CCEs used for transmission of a PDCCH is determined according to a channel state by the eNB. For example, one CCE is sufficient for a PDCCH directed to a UE in a good DL channel state (a UE near to the eNB). On the other hand, 8 CCEs may be required for a PDCCH directed to a UE in a poor DL channel state (a UE at a cell edge) in order to ensure sufficient robustness.

[Table 2] below illustrates PDCCH formats. 4 PDCCH formats are supported according to CCE aggregation levels as illustrated in [Table 2].

TABLE 2

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

A different CCE aggregation level is allocated to each UE because the format or Modulation and Coding Scheme (MCS) level of control information delivered in a PDCCH for the UE is different. An MCS level defines a code rate used for data coding and a modulation order. An adaptive MCS level is used for link adaptation. In general, three or four MCS levels may be considered for control channels carrying control information.

Regarding the formats of control information, control information transmitted on a PDCCH is called DCI. The configuration of information in PDCCH payload may be changed depending on the DCI format. The PDCCH payload is information bits. [Table 3] lists DCI according to DCI formats.

TABLE 3

| DCI Format | Description |
|---|---|
| Format 0 | Resource grants for the PUSCH transmissions (uplink) |
| Format 1 | Resource assignments for single codeword PDSCH transmissions (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g. paging/broadcast system information) |
| Format 1D | Compact resource assignments for PDSCH using multi-user MIMO (mode 5) |
| Format 2 | Resource assignments for PDSCH for closed-loop MIMO operation (mode 4) |
| Format 2A | Resource assignments for PDSCH for open-loop MIMO operation (mode 3) |
| Format 3/3A | Power control commands for PUCCH and PUSCH with 2-bit/1-bit power adjustment |
| Format 4 | Scheduling of PUSCH in one UL cell with multi-antenna port transmission mode |

Referring to [Table 3], the DCI formats include Format 0 for PUSCH scheduling, Format 1 for single-codeword PDSCH scheduling, Format 1A for compact single-codeword PDSCH scheduling, Format 1C for very compact DL-SCH scheduling, Format 2 for PDSCH scheduling in a closed-loop spatial multiplexing mode, Format 2A for PDSCH scheduling in an open-loop spatial multiplexing mode, and Format 3/3A for transmission of Transmission Power Control (TPC) commands for uplink channels. DCI Format 1A is available for PDSCH scheduling irrespective of the transmission mode of a UE.

The length of PDCCH payload may vary with DCI formats. In addition, the type and length of PDCCH payload may be changed depending on compact or non-compact scheduling or the transmission mode of a UE.

The transmission mode of a UE may be configured for DL data reception on a PDSCH at the UE. For example, DL data carried on a PDSCH includes scheduled data, a paging message, a random access response, broadcast information on a BCCH, etc. for a UE. The DL data of the PDSCH is related to a DCI format signaled through a PDCCH. The transmission mode may be configured semi-statically for the UE by higher-layer signaling (e.g. Radio Resource Control (RRC) signaling). The transmission mode may be classified as single antenna transmission or multi-antenna transmission.

A transmission mode is configured for a UE semi-statically by higher-layer signaling. For example, multi-antenna transmission scheme may include transmit diversity, open-loop or closed-loop spatial multiplexing, Multi-User Multiple Input Multiple Output (MU-MIMO), or beamforming Transmit diversity increases transmission reliability by transmitting the same data through multiple Tx antennas. Spatial multiplexing enables high-speed data transmission without increasing a system bandwidth by simultaneously transmitting different data through multiple Tx antennas. Beamforming is a technique of increasing the Signal to Interference plus Noise Ratio (SINR) of a signal by weighting multiple antennas according to channel states.

A DCI format for a UE depends on the transmission mode of the UE. The UE has a reference DCI format monitored according to the transmission mode configure for the UE. The following 10 transmission modes are available to UEs:

(1) Transmission mode 1: Single antenna port (port 0);
(2) Transmission mode 2: Transmit diversity;
(3) Transmission mode 3: Open-loop spatial multiplexing when the number of layer is larger than 1 or Transmit diversity when the rank is 1;
(4) Transmission mode 4: Closed-loop spatial multiplexing;
(5) Transmission mode 5: MU-MIMO;
(6) Transmission mode 6: Closed-loop rank-1 precoding;
(7) Transmission mode 7: Precoding supporting a single layer transmission, which does not based on a codebook (Rel-8);
(8) Transmission mode 8: Precoding supporting up to two layers, which do not based on a codebook (Rel-9);
(9) Transmission mode 9: Precoding supporting up to eight layers, which do not based on a codebook (Rel-10); and
(10) Transmission mode 10: Precoding supporting up to eight layers, which do not based on a codebook, used for CoMP (Rel-11).

1.2.3 PDCCH Transmission

The eNB determines a PDCCH format according to DCI that will be transmitted to the UE and adds a Cyclic Redundancy Check (CRC) to the control information. The CRC is masked by a unique Identifier (ID) (e.g. a Radio Network Temporary Identifier (RNTI)) according to the owner or usage of the PDCCH. If the PDCCH is destined for a specific UE, the CRC may be masked by a unique ID (e.g. a cell-RNTI (C-RNTI)) of the UE. If the PDCCH carries a paging message, the CRC of the PDCCH may be masked by a paging indicator ID (e.g. a Paging-RNTI (P-RNTI)). If the PDCCH carries system information, particularly, a System Information Block (SIB), its CRC may be masked by a system information ID (e.g. a System Information RNTI (SI-RNTI)). To indicate that the PDCCH carries a random access response to a random access preamble transmitted by a UE, its CRC may be masked by a Random Access-RNTI (RA-RNTI).

Then the eNB generates coded data by channel-encoding the CRC-added control information. The channel coding may be performed at a code rate corresponding to an MCS level. The eNB rate-matches the coded data according to a CCE aggregation level allocated to a PDCCH format and generates modulation symbols by modulating the coded data. Herein, a modulation order corresponding to the MCS level may be used for the modulation. The CCE aggregation level for the modulation symbols of a PDCCH may be one of 1, 2, 4, and 8. Subsequently, the eNB maps the modulation symbols to physical REs (i.e. CCE to RE mapping).

1.2.4 Blind Decoding (BD)

A plurality of PDCCHs may be transmitted in a subframe. That is, the control region of a subframe includes a plurality of CCEs, CCE 0 to CCE $N_{CCE,k}-1$. $N_{CCE,k}$ is the total number of CCEs in the control region of a $k^{th}$ subframe. A UE monitors a plurality of PDCCHs in every subframe. This means that the UE attempts to decode each PDCCH according to a monitored PDCCH format.

The eNB does not provide the UE with information about the position of a PDCCH directed to the UE in an allocated control region of a subframe. Without knowledge of the position, CCE aggregation level, or DCI format of its PDCCH, the UE searches for its PDCCH by monitoring a set of PDCCH candidates in the subframe in order to receive a control channel from the eNB. This is called blind decoding. Blind decoding is the process of demasking a CRC part with a UE ID, checking a CRC error, and determining whether a corresponding PDCCH is a control channel directed to a UE by the UE.

The UE monitors a PDCCH in every subframe to receive data transmitted to the UE in an active mode. In a Discontinuous Reception (DRX) mode, the UE wakes up in a monitoring interval of every DRX cycle and monitors a PDCCH in a subframe corresponding to the monitoring interval. The PDCCH-monitored subframe is called a non-DRX subframe.

To receive its PDCCH, the UE should blind-decode all CCEs of the control region of the non-DRX subframe. Without knowledge of a transmitted PDCCH format, the UE should decode all PDCCHs with all possible CCE aggregation levels until the UE succeeds in blind-decoding a PDCCH in every non-DRX subframe. Since the UE does not know the number of CCEs used for its PDCCH, the UE should attempt detection with all possible CCE aggregation levels until the UE succeeds in blind decoding of a PDCCH.

In the LTE system, the concept of Search Space (SS) is defined for blind decoding of a UE. An SS is a set of PDCCH candidates that a UE will monitor. The SS may have a different size for each PDCCH format. There are two types of SSs, Common Search Space (CSS) and UE-specific/Dedicated Search Space (USS).

While all UEs may know the size of a CSS, a USS may be configured for each individual UE. Accordingly, a UE should monitor both a CSS and a USS to decode a PDCCH. As a consequence, the UE performs up to 44 blind decodings in one subframe, except for blind decodings based on different CRC values (e.g., C-RNTI, P-RNTI, SI-RNTI, and RA-RNTI).

In view of the constraints of an SS, the eNB may not secure CCE resources to transmit PDCCHs to all intended UEs in a given subframe. This situation occurs because the remaining resources except for allocated CCEs may not be included in an SS for a specific UE. To minimize this obstacle that may continue in the next subframe, a UE-specific hopping sequence may apply to the starting point of a USS.

[Table 4] illustrates the sizes of CSSs and USSs.

TABLE 4

| PDCCH format | Number of CCEs (n) | Number of candidates in common search space | Number of candidates in dedicated search space |
|---|---|---|---|
| 0 | 1 | — | 6 |
| 1 | 2 | — | 6 |

TABLE 4-continued

| PDCCH format | Number of CCEs (n) | Number of candidates in common search space | Number of candidates in dedicated search space |
|---|---|---|---|
| 2 | 4 | 4 | 2 |
| 3 | 8 | 2 | 2 |

To mitigate the load of the UE caused by the number of blind decoding attempts, the UE does not search for all defined DCI formats simultaneously. Specifically, the UE always searches for DCI Format 0 and DCI Format 1A in a USS. Although DCI Format 0 and DCI Format 1A are of the same size, the UE may distinguish the DCI formats by a flag for format 0/format 1a differentiation included in a PDCCH. Other DCI formats than DCI Format 0 and DCI Format 1A, such as DCI Format 1, DCI Format 1B, and DCI Format 2 may be required for the UE.

The UE may search for DCI Format 1A and DCI Format 1C in a CSS. The UE may also be configured to search for DCI Format 3 or 3A in the CSS. Although DCI Format 3 and DCI Format 3A have the same size as DCI Format 0 and DCI Format 1A, the UE may distinguish the DCI formats by a CRC scrambled with an ID other than a UE-specific ID.

An SS $S_k^{(L)}$ is a PDCCH candidate set with a CCE aggregation level $L \in \{1, 2, 4, 8\}$. The CCEs of PDCCH candidate set m in the SS may be determined by the following equation.

$$L \cdot \{(Y_k + m) \bmod \lfloor N_{CCE,k}/L \rfloor\} + i \quad \text{[Equation 1]}$$

where $M^{(L)}$ is the number of PDCCH candidates with CCE aggregation level L to be monitored in the SS, $m = 0, \ldots, M^{(L)} - 1$, i is the index of a CCE in each PDCCH candidate, and $i = 0, \ldots, L-1$. $k = \lfloor n_s/2 \rfloor$ where $n_s$ is the index of a slot in a radio frame.

As described before, the UE monitors both the USS and the CSS to decode a PDCCH. The CSS supports PDCCHs with CCE aggregation levels $\{4, 8\}$ and the USS supports PDCCHs with CCE aggregation levels $\{1, 2, 4, 8\}$. [Table 5] illustrates PDCCH candidates monitored by a UE.

TABLE 5

| Type | Search space $S_k^{(L)}$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to [Equation 1], for two aggregation levels, $L=4$ and $L=8$, $Y_k$ is set to 0 in the CSS, whereas $Y_k$ is defined by [Equation 2] for aggregation level L in the USS.

$$Y_k = (A \cdot Y_{k-1}) \bmod D \quad \text{[Equation 2]}$$

where $Y_{-1} = n_{RNTI} \neq 0$, $n_{RNTI}$ indicating an RNTI value. $A = 39827$ and $D = 65537$.

1.3. PUCCH (Physical Uplink Control Channel)

PUCCH may include the following formats to transmit control information.

(1) Format 1: On-Off keying (OOK) modulation, used for SR (Scheduling Request)

(2) Format 1a & 1b: Used for ACK/NACK transmission
1) Format 1a: BPSK ACK/NACK for 1 codeword
2) Format 1b: QPSK ACK/NACK for 2 codewords (3) Format 2: QPSK modulation, used for CQI transmission (4) Format 2a & Format 2b: Used for simultaneous transmission of CQI and ACK/NACK (5) Format 3: Used for multiple ACK/NACK transmission in a carrier aggregation environment Table 6 shows a modulation scheme according to PUCCH format and the number of bits per subframe. Table 7 shows the number of reference signals (RS) per slot according to PUCCH format. Table 8 shows SC-FDMA symbol location of RS (reference signal) according to PUCCH format. In Table 6, PUCCH format 2a and PUCCH format 2b correspond to a case of normal cyclic prefix (CP).

TABLE 6

| PUCCH format | Modulation scheme | No. of bits per subframe, Mbit |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |
| 3 | QPSK | 48 |

TABLE 7

| PUCCH format | Normal CP | Extended CP |
|---|---|---|
| 1, 1a, 1b | 3 | 2 |
| 2, 3 | 2 | 1 |
| 2a, 2b | 2 | N/A |

TABLE 8

| PUCCH format | SC-FDMA symbol location of RS | |
|---|---|---|
| | Normal CP | Extended CP |
| 1, 1a, 1b | 2, 3, 4 | 2, 3 |
| 2, 3 | 1, 5 | 3 |
| 2a, 2b | 1, 5 | N/A |

Figure 6:
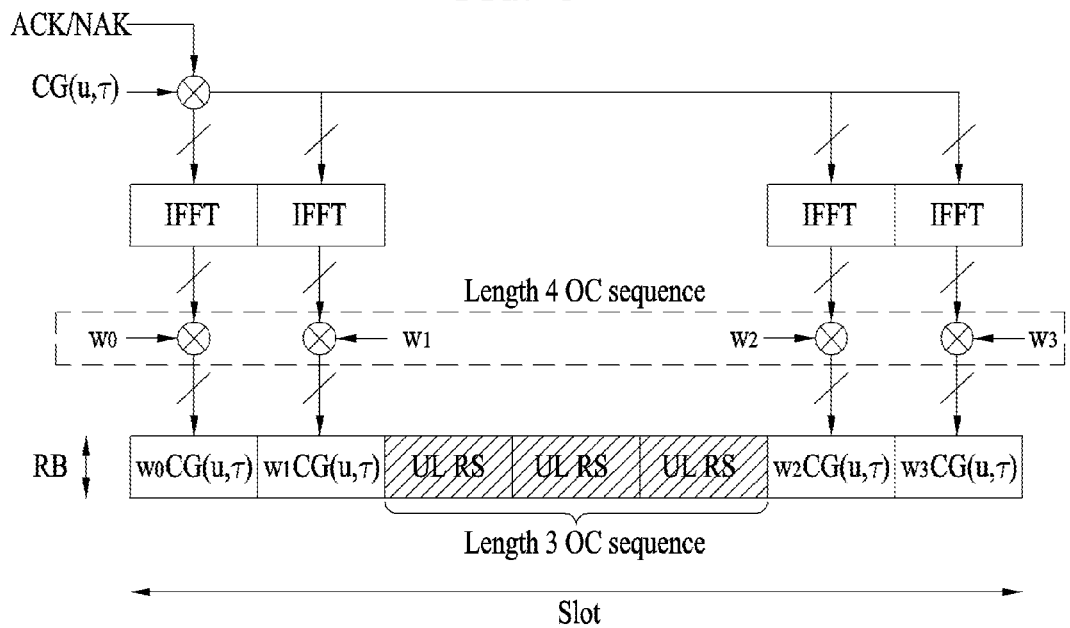
FIG. 6 illustrates PUCCH formats 1a and 1b for use in a normal cyclic prefix (CP) case.
Figure 7:
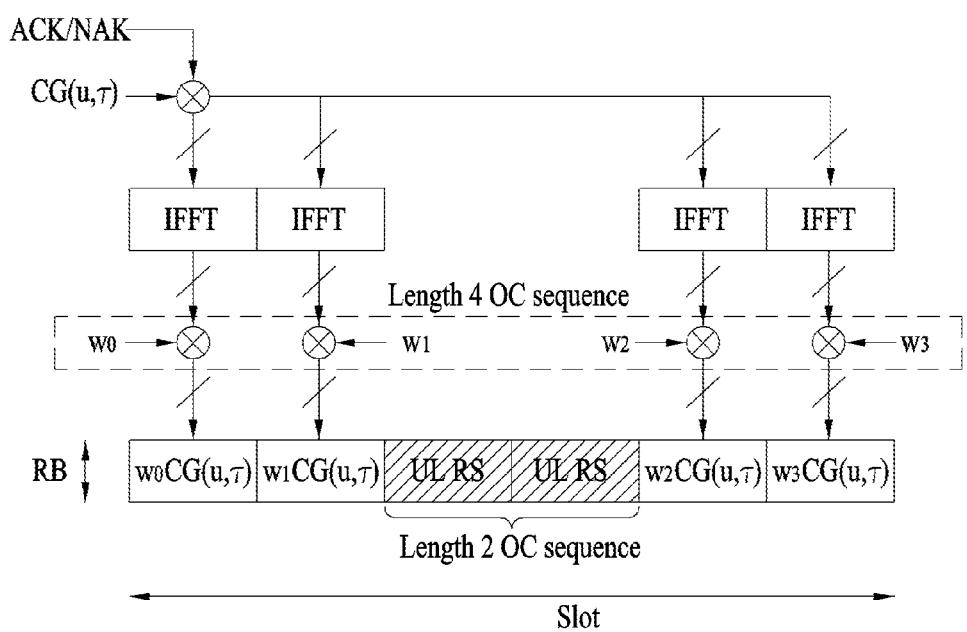
FIG. 7 illustrates PUCCH formats 1a and 1b for use in an extended CP case.

FIG. 6 shows PUCCH formats 1a and 1b in case of a normal cyclic prefix. And, FIG. 7 shows PUCCH formats 1a and 1b in case of an extended cyclic prefix.

According to the PUCCH formats 1a and 1b, control information of the same content is repeated in a subframe by slot unit. In each user equipment, ACK/NACK signal is transmitted on a different resource constructed with a different cyclic shift (CS) (frequency domain code) and an orthogonal cover (OC) or orthogonal cover code (OCC) (time domain spreading code) of CG-CAZAC (computer-generated constant amplitude zero auto correlation) sequence. For instance, the OC includes Walsh/DFT orthogonal code. If the number of CS and the number of OC are 6 and 3, respectively, total 18 user equipments may be multiplexed within the same PRB (physical resource block) with reference to a single antenna. Orthogonal sequences w0, w1, w2 and w3 may be applicable to a random time domain (after FFT modulation) or a random frequency domain (before FFT modulation).

For persistent scheduling with SR, ACK/NACK resource constructed with CS, OC and PRB (physical resource block) may be allocated to a user equipment through RRC (radio resource control. For non-persistent scheduling with dynamic ACK/NACK, the ACK/NACK resource may be implicitly allocated to a user equipment using a smallest CCE index of PDCCH corresponding to PDSCH.

Length-4 orthogonal sequence (OC) and length-3 orthogonal sequence for PUCCH format 1/1a/1b are shown in Table 9 and Table 10, respectively.

TABLE 9

| Sequence index $n_{oc}(n_s)$ | Orthogonal sequences $[w(0) \ldots w(N_{SF}^{PUCCH} - 1)]$ |
|---|---|
| 0 | [+1 +1 +1 +1] |
| 1 | [+1 −1 +1 −1] |
| 2 | [+1 −1 −1 +1] |

TABLE 10

| Sequence index $n_{oc}(n_s)$ | Orthogonal sequences $[w(0) \ldots w(N_{SF}^{PUCCH} - 1)]$ |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

Orthogonal sequence (OC) $[\overline{w}(0) \ldots \overline{w}(N_{RS}^{PUCCH}-1)]$ for a reference signal in PUCCH format 1/1a/1b is shown in Table 11.

TABLE 11

| Sequence index $\overline{n}_{oc}(n_s)$ | Normal cyclic prefix | Extended cyclic prefix |
|---|---|---|
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

Figure 8:
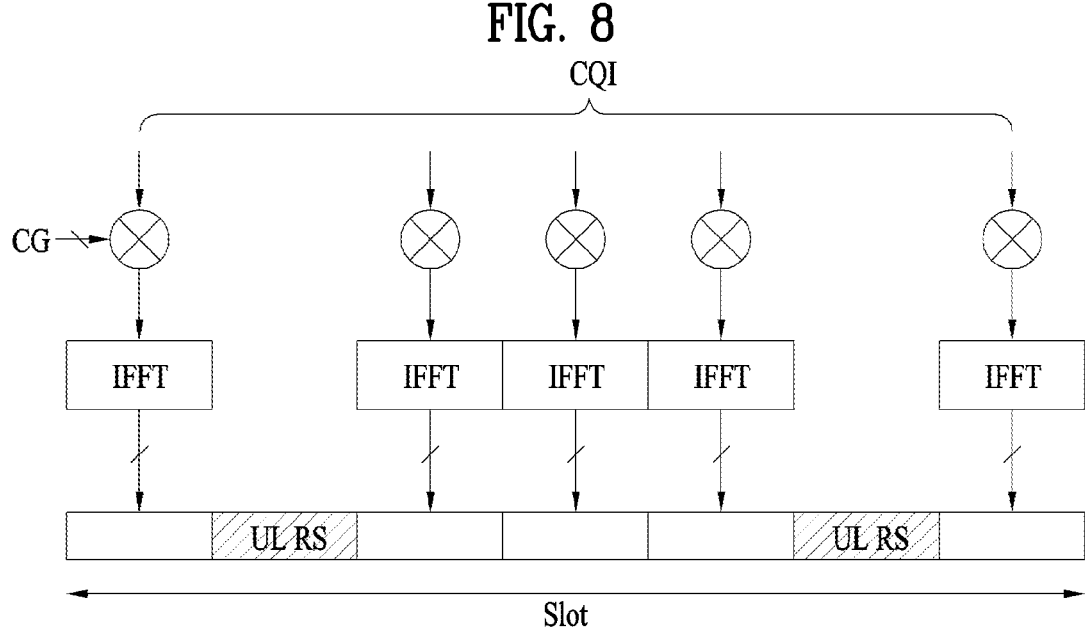
FIG. 8 illustrates PUCCH formats 2/2a/2b in a normal cyclic prefix (CP) case.

FIG. 8 shows PUCCH format 2/2a/2b in case of a normal cyclic prefix. And, FIG. 9 shows PUCCH format 2/2a/2b in case of an extended cyclic prefix.

Figure 9:
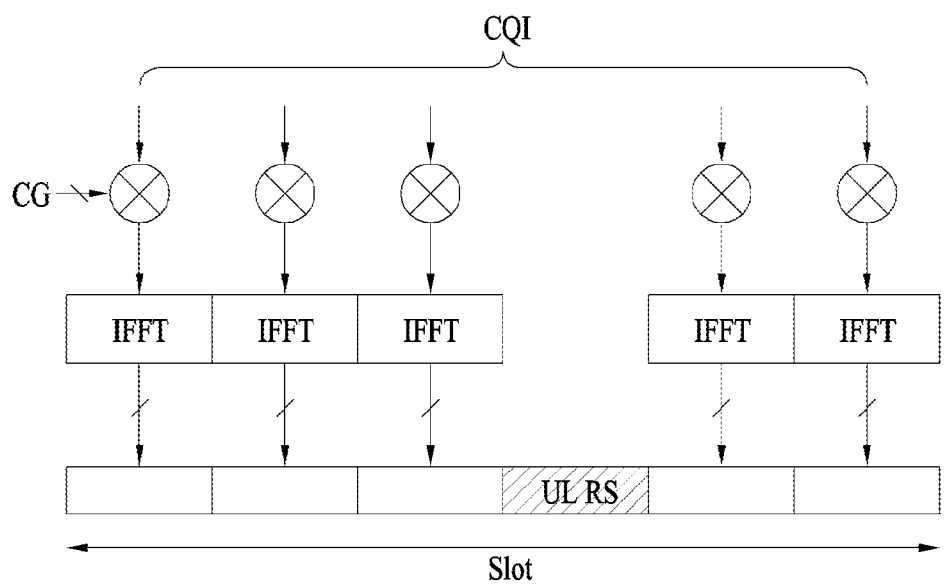
FIG. 9 illustrates PUCCH formats 2/2a/2b in an extended CP case.

Referring to FIG. 8 and FIG. 9, in case of a normal CP, a subframe is constructed with 10 QPSK data symbols as well as RS symbol. Each QPSK symbol is spread in a frequency domain by CS and is then mapped to a corresponding SC-FDMA symbol. SC-FDMA symbol level CS hopping may be applied to randomize inter-cell interference. The RS may be multiplexed by CDM using a cyclic shift. For instance, assuming that the number of available CSs is 12, 12 user equipments may be multiplexed in the same PRB. For instance, assuming that the number of available CSs is 6, 6 user equipments may be multiplexed in the same PRB. In brief, a plurality of user equipments in PUCCH format 1/1a/1b and PUCCH format 2/2a/2b may be multiplexed by 'CS+OC+PRB' and 'CS+PRB', respectively.

FIG. 10 is a diagram of ACK/NACK channelization for PUCCH formats 1a and 1b. In particular, FIG. 10 corresponds to a case of '$\Delta_{shift}^{PUCCH}=2$'.

Figure 11:
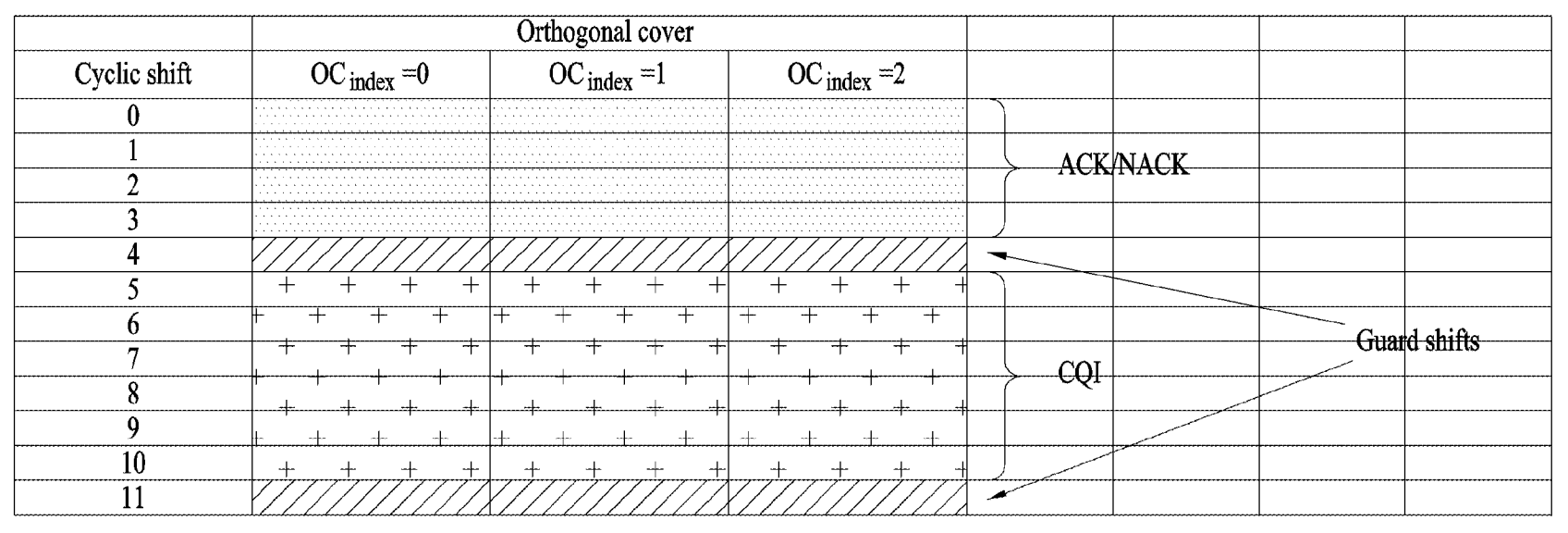

FIG. 11 is a diagram of channelization for a hybrid structure of PUCCH format 1/1a/1b and PUCCH format 2/2a/2b.

Cyclic shift (CS) hopping and orthogonal cover (OC) remapping may be applicable in a following manner.

(1) Symbol-based cell-specific CS hopping for randomization of inter-cell interference (2) Slot level CS/OC remapping
 1) For inter-cell interference randomization
 2) Slot based access for mapping between ACK/NACK channel and resource (k)

Meanwhile, resource $n_r$ for PUCCH format 1/1a/1b may include the following combinations.

(1) CS (=equal to DFT orthogonal code at symbol level) ($n_{cs}$)
(2) OC (orthogonal cover at slot level) ($n_{oc}$)
(3) Frequency RB (Resource Block) ($n_{rb}$)

If indexes indicating CS, OC and RB are set to $n_{cs}$, $n_{oc}$, $n_{rb}$, respectively, a representative index $n_r$ may include $n_{cs}$, $n_{oc}$ and $n_{rb}$. In this case, the $n_r$ may meet the condition of '$n_r=(n_{cs}, n_{oc}, n_{rb})$'.

The combination of CQI, PMI, RI, CQI and ACK/NACK may be delivered through the PUCCH format 2/2a/2b. And, Reed Muller (RM) channel coding may be applicable.

For instance, channel coding for UL (uplink) CQI in LTE system may be described as follows. First of all, bitstreams $a_0, a_1, a_2, a_3, \ldots, a_{A-1}$ may be coded using (20, A) RM code. In this case, $a_0$ and $a_{A-1}$ indicates MSB (Most Significant Bit) and LSB (Least Significant Bit), respectively. In case of an extended cyclic prefix, maximum information bits include 11 bits except a case that QI and ACK/NACK are simultaneously transmitted. After coding has been performed with 20 bits using the RM code, QPSK modulation may be applied. Before the BPSK modulation, coded bits may be scrambled.

Table 12 shows a basic sequence for (20, A) code.

TABLE 12

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |

TABLE 12-continued

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

Channel coding bits $b_0, b_1, b_2, b_3, \ldots, b_{B-1}$ may be generated by Formula 1.

$$b_i = \sum_{n=0}^{A-1} (a_n \cdot M_{i,n}) \bmod 2 \qquad [\text{Formula 3}]$$

In Formula 3, 'i=0, 1, 2, . . . , B-1' is met.

In case of wideband repots, a bandwidth of UCI (uplink control information) field for CQI/PMI can be represented as Tables 8 to 10 in the following.

Table 13 shows UCI (Uplink Control Information) field for broadband report (single antenna port, transmit diversity) or open loop spatial multiplexing PDSCH CQI feedback.

TABLE 13

| Field | Bandwidth |
|---|---|
| Broadband CQI | 4 |

Table 14 shows UL control information (UCI) field for CQI and PMI feedback in case of wideband reports (closed loop spatial multiplexing PDSCH transmission).

TABLE 14

| | Bandwidth | | | |
|---|---|---|---|---|
| | 2 antenna ports | | 4 antenna ports | |
| Field | rank = 1 | rank = 2 | rank = 1 | Rank > 1 |
| Wideband CQI | 4 | 4 | 4 | 4 |
| Spatial differential CQI | 0 | 3 | 0 | 3 |
| Precoding Matrix Indication | 2 | 1 | 4 | 4 |

Table 15 shows UL control information (UCI) field for RI feedback in case of wideband reports.

TABLE 15

| | Bit widths | | |
|---|---|---|---|
| | | 4 antenna ports | |
| Field | 2 antenna ports | Max. 2 layers | Max. 4 layers |
| Rank Indication | 1 | 1 | 2 |

Figure 12:
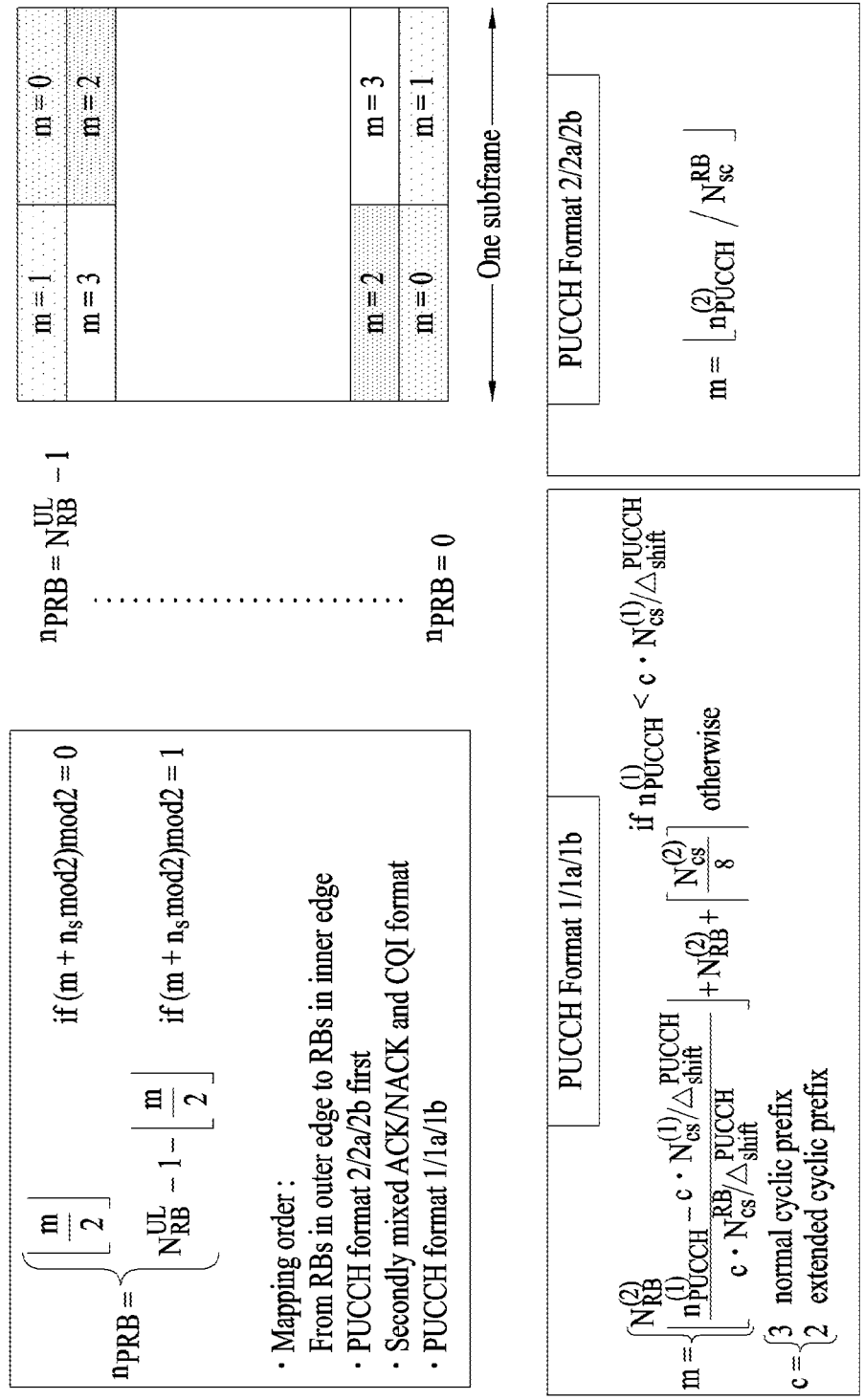
FIG. 12 illustrates allocation of a physical resource block (PRB).
Figure 20:
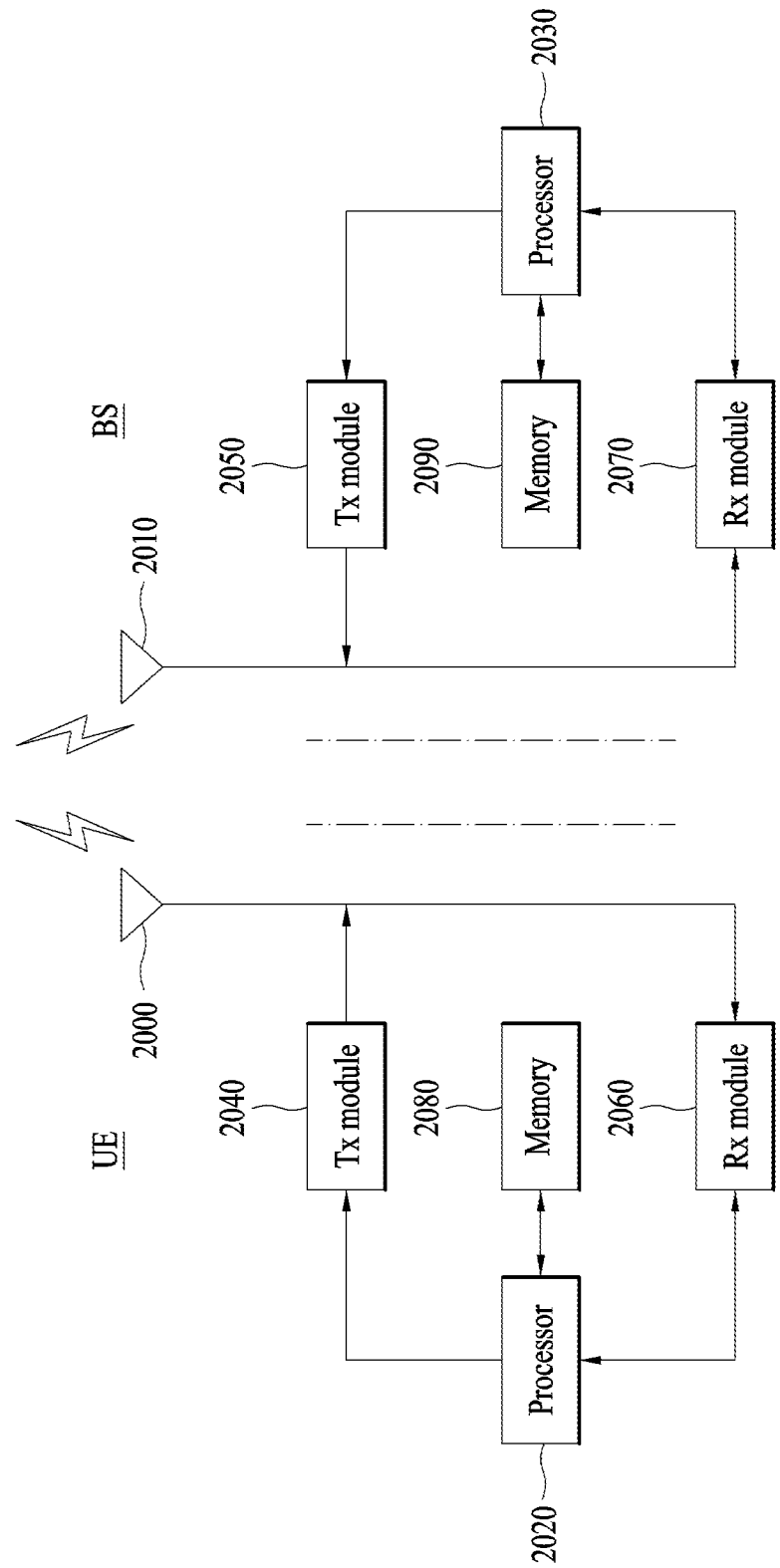
FIG. 20 shows a device for implementing the methods described with reference to FIGS. 1 to 19.

FIG. 12 is a diagram for PRB allocation. Referring to FIG. 20, PRB may be usable for PUCCH transmission in a slot $n_s$.

2. Carrier Aggregation (CA) Environment 2.1 CA Overview

A 3GPP LTE system (conforming to Rel-8 or Rel-9) (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present disclosure, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present disclosure may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher-layer RRCConnectionReconfiguraiton message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present disclosure.

Figure 13:
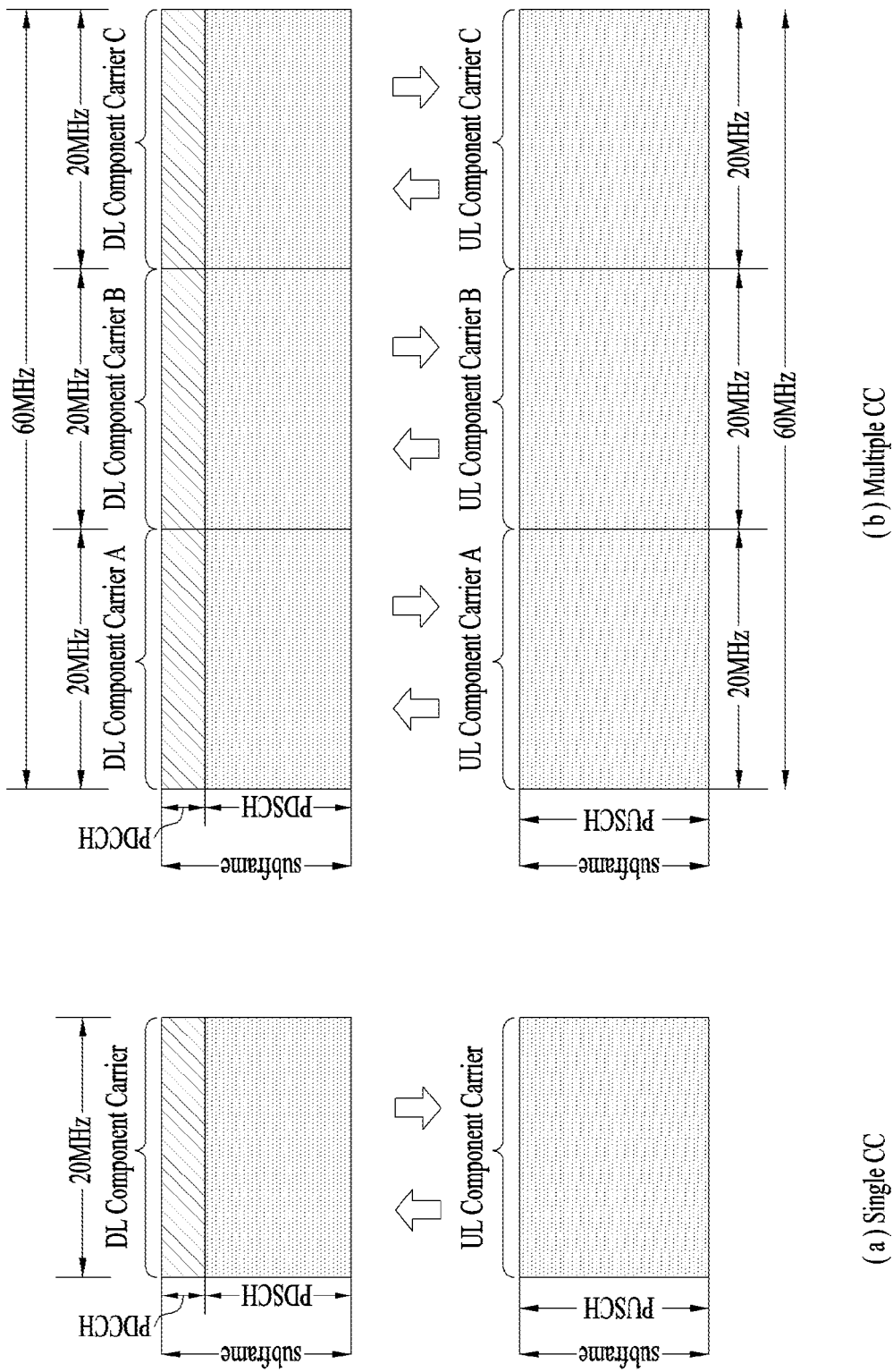
FIG. 13 is a diagram illustrating an example of a component carrier (CC) of the embodiments and carrier aggregation (CA) used in an LTE_A system.

FIG. 13 illustrates an example of CCs and CA in the LTE-A system, which are used in embodiments of the present disclosure.

FIG. 13(a) illustrates a single carrier structure in the LTE system. There are a DL CC and a UL CC and one CC may have a frequency range of 20 MHz.

FIG. 13(b) illustrates a CA structure in the LTE-A system. In the illustrated case of FIG. 13(b), three CCs each having 20 MHz are aggregated. While three DL CCs and three UL CCs are configured, the numbers of DL CCs and UL CCs are not limited. In CA, a UE may monitor three CCs simultaneously, receive a DL signal/DL data in the three CCs, and transmit a UL signal/UL data in the three CCs.

If a specific cell manages N DL CCs, the network may allocate M (M≤N) DL CCs to a UE. The UE may monitor only the M DL CCs and receive a DL signal in the M DL CCs. The network may prioritize L (L≤M≤N) DL CCs and allocate a main DL CC to the UE. In this case, the UE should monitor the L DL CCs. The same thing may apply to UL transmission.

The linkage between the carrier frequencies of DL resources (or DL CCs) and the carrier frequencies of UL resources (or UL CCs) may be indicated by a higher-layer message such as an RRC message or by system information. For example, a set of DL resources and UL resources may be configured based on linkage indicated by System Information Block Type 2 (SIB2). Specifically, DL-UL linkage may refer to a mapping relationship between a DL CC carrying a PDCCH with a UL grant and a UL CC using the UL grant, or a mapping relationship between a DL CC (or a UL CC) carrying HARQ data and a UL CC (or a DL CC) carrying an HARQ ACK/NACK signal.

2.2 Cross Carrier Scheduling

Two scheduling schemes, self-scheduling and cross carrier scheduling are defined for a CA system, from the perspective of carriers or serving cells. Cross carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross carrier scheduling may be activated or deactivated UE-specifically and indicated to each UE semi-statically by higher-layer signaling (e.g. RRC signaling).

If cross carrier scheduling is activated, a Carrier Indicator Field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross carrier scheduling is deactivated, this implies that the PDCCH monitoring set is always identical to the UE DL CC set. In this case, there is no need for signaling the PDCCH monitoring set. However, if cross carrier scheduling is activated, the PDCCH monitoring set may be defined within the UE DL CC set. That is, the eNB transmits a PDCCH only in the PDCCH monitoring set to schedule a PDSCH or PUSCH for the UE.

Figure 14:
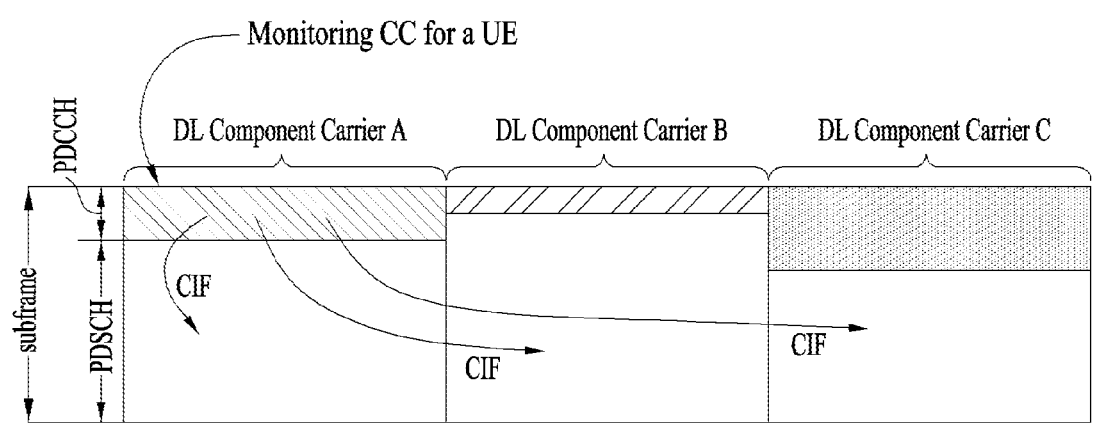
FIG. 14 illustrates a subframe structure of an LTE-A system according to cross-carrier scheduling.

FIG. 14 illustrates a cross carrier-scheduled subframe structure in the LTE-A system, which is used in embodiments of the present disclosure.

Referring to FIG. 14, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher-layer signaling, only DL CC 'A' may carry a PDCCH that schedules a PDSCH in the same DL CC 'A' or another CC. Herein, no PDCCH is transmitted in DL CC 'B' and DL CC 'C' that are not configured as PDCCH monitoring DL CCs.

Figure 15:
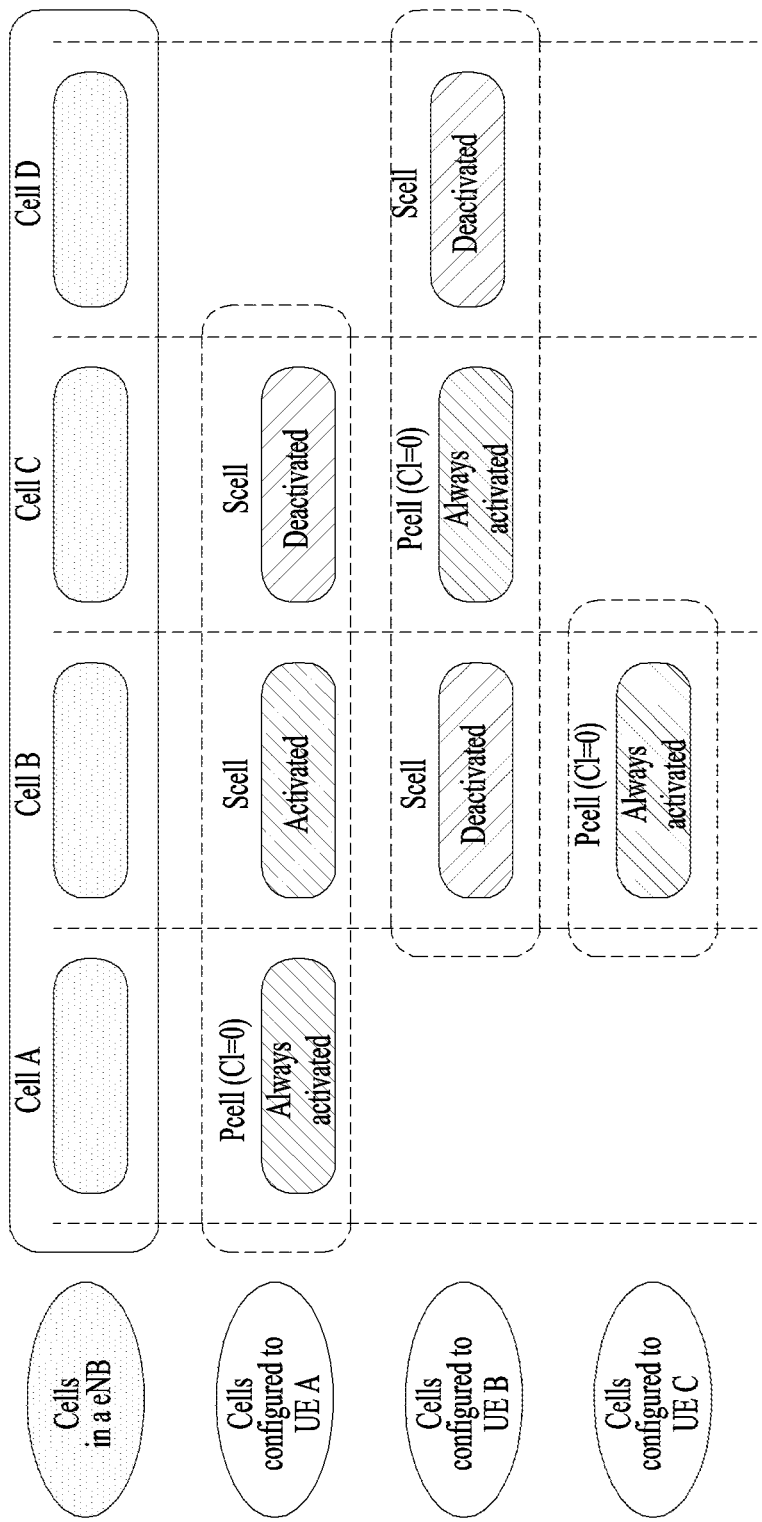
FIG. 15 is conceptual diagram illustrating a construction of serving cells according to cross-carrier scheduling.

FIG. 15 is conceptual diagram illustrating a construction of serving cells according to cross-carrier scheduling.

Referring to FIG. 15, an eNB (or BS) and/or UEs for use in a radio access system supporting carrier aggregation (CA) may include one or more serving cells. In FIG. 8, the eNB can support a total of four serving cells (cells A, B, C and D). It is assumed that UE A may include Cells (A, B, C), UE B may include Cells (B, C, D), and UE C may include Cell B. In this case, at least one of cells of each UE may be composed of P Cell. In this case, P Cell is always activated, and S Cell may be activated or deactivated by the eNB and/or UE.

The cells shown in FIG. 15 may be configured per UE. The above-mentioned cells selected from among cells of the eNB, cell addition may be applied to carrier aggregation (CA) on the basis of a measurement report message received from the UE. The configured cell may reserve resources for ACK/NACK message transmission in association with PDSCH signal transmission. The activated cell is configured to actually transmit a PDSCH signal and/or a PUSCH signal from among the configured cells, and is configured to transmit CSI reporting and Sounding Reference Signal (SRS) transmission. The deactivated cell is configured not to transmit/receive PDSCH/PUSCH signals by an eNB command or a timer operation, and CRS reporting and SRS transmission are interrupted.

2.3 CA PUCCH (Carrier Aggregation Physical Uplink Control Channel)

In a wireless communication system supportive of carrier aggregation, PUCCH format for feeding back UCI (e.g., multi-ACK/NACK bit) can be defined. For clarity of the following description, such PUCCH format shall be named CA PUCCH format.

Figure 16:
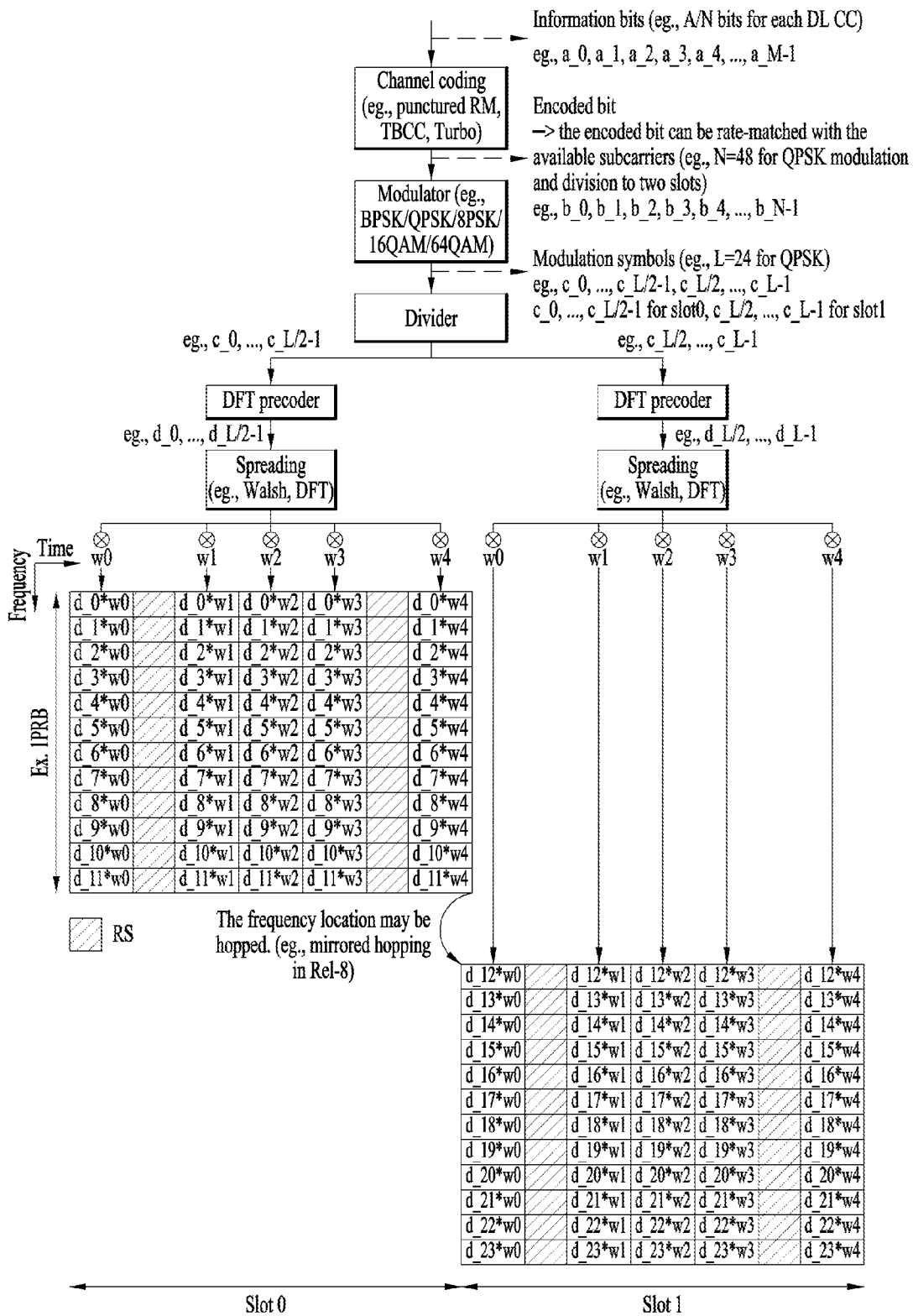
FIG. 16 is a conceptual diagram illustrating CA PUCCH signal processing.

FIG. 16 is a diagram for one example of a signal processing process of CA PUCCH.

Referring to FIG. 16, a channel coding block generates coding bits (e.g., encoded bits, coded bits, etc.) (or codeword) $b\_0, b\_1, \ldots$ and $b\_N-1$ by channel-coding information bits $a\_0, a\_1, \ldots$ and $a\_M-1$ (e.g., multiple ACK/NACK bits). In this case, the M indicates a size of information bits and the N indicates a size of the coding bits. The information bits may include multiple ACK/NACK for UL control information (UCI), e.g., a plurality of data (or PDSCH) received via a plurality of DL CCS. In this case, the information bits $a\_0, a\_1, \ldots a\_M-1$ may be joint-coded irrespective of type/number/size of the UCI configuring the information bits. For instance, in case that information bits include multiple ACK/NACK for a plurality of DL CCs, channel coding may not be performed per DL CC or individual ACK/NACK bit but may be performed on all bit information, from which a single codeword may be generated. And, channel coding is non-limited by this. Moreover, the channel coding may include one of simplex repetition, simplex coding, RM (Reed Muller) coding, punctured RM coding, TBCC (tail-biting convolutional coding), LDPC (low-density parity-check), turbo coding and the like. Besides, coding bits may be rate-matched in consideration of a modulation order and a resource size (not shown in the drawing). A rate matching function may be included as a part of the channel coding block or may be performed via a separate function block.

A modulator generates modulated symbols $c\_0, c\_1 \ldots c\_L-1$ by modulating coding bits $b\_0, b\_1 \ldots b\_N-1$. In this case, the L indicates a size of modulated symbol. This modulation scheme may be performed in a manner of modifying a size and phase of a transmission signal. For instance, the modulation scheme may include one of n-PSK (Phase Shift Keying), n-QAM (Quadrature Amplitude Modulation) and the like, where n is an integer equal to or greater than 2. In particular, the modulation scheme may include one of BPSK (Binary PSK), QPSK (Quadrature PSK), 8-PSK, QAM, 16-QAM, 64-QAM and the like.

A divider divides the modulated symbols $c\_0, c\_1 \ldots c\_L-1$ to slots, respectively. A sequence/pattern/scheme for dividing the modulated symbols to the slots may be specially non-limited. For instance, the divider may be able to divide the modulated symbols to the corresponding slots in order from a head to tail (Localized scheme). In doing so, as shown in the drawing, the modulated symbols $c\_0, c\_1 \ldots c\_L/2-1$ may be divided to the slot 0 and the modulated symbols $c\_L/2, c\_L/2+1 \ldots c\_L-1$ may be divided to the slot 1. Moreover, the modulated symbols may be divided to the corresponding slots, respectively, by interleaving or permutation. For instance, the even-numbered modulated symbol may be divided to the slot 0, while the odd-numbered modulated symbol may be divided to the slot 1. The modulation scheme and the dividing scheme may be switched to each other in order.

A DFT precoder may perform DFT precoding (e.g., 12-point DFT) on the modulated symbols divided to the corresponding slots to generate a single carrier waveform. Referring to the drawing, the modulated symbols $c\_0, c\_1 \ldots c\_L/2-1$ divided to the corresponding slot 0 may be DFT-precoded into DFT symbols $d\_0, d\_1 \ldots d\_L/2-1$, and the modulated symbols $c\_L/2, c\_L/2+1 \ldots c\_L-1$ divided to the slot 1 may be DFT-precoded into DFT symbols $d\_L/2$, d_L/2+1 . . . d_L−1. Moreover, the DFT precoding may be replaced by another linear operation (e.g., Walsh precoding) corresponding thereto.

A spreading block may spread the DFT-performed signal at SC-FDMA symbols level (e.g., time domain). The time-domain spreading at the SC-FDMA level may be performed using a spreading code (sequence). The spreading code may include pseudo orthogonal code and orthogonal code. The pseudo orthogonal code may include PN (pseudo noise) code, by which the pseudo orthogonal code may be non-limited. The orthogonal code may include Walsh code and DFT code, by which the orthogonal code may be non-limited. The orthogonal code (OC) may be interchangeably used with one of an orthogonal sequence, an orthogonal cover (OC) and an orthogonal cover code (OCC). In this specification, for example, the orthogonal code may be mainly described as a representative example of the spreading code for clarity and convenience of the following description. Optionally, the orthogonal code may be substituted with the pseudo orthogonal code. A maximum value of a spreading code size (or a spreading factor: SF) may be limited by the number of SC-FDAM symbols used for control information transmission. For example, in case that 5 SC-FDMA symbols are used in one slot for control information transmission, orthogonal codes (or pseudo orthogonal codes) w0, w1, w2, w3 and w4 of length 5 may be used per slot. The SF may mean a spreading degree of the control information and may be associated with a multiplexing order or an antenna multiplexing order of a user equipment. The SF may be variable like 1, 2, 3, 4, 5 . . . depending on a requirement of a system. The SF may be defined in advance between a base station and a user equipment. And, the SF may be notified to a user equipment via DCI or RRC signaling.

The signal generated through the above-described process may be mapped to subcarrier within the PRB and may be then transformed into a time-domain signal through IFFT. CP may be attached to the time-domain signal. The generated SC-FDMA symbol may be then transmitted through an RF stage.

2.4 CSI (Channel State Information) Feedback Through PUCCH

First of all, in the 3GPP LTE system, when a DL reception entity (e.g., a user equipment) is connected to a DL transmission entity (e.g., a base station), the DL reception entity performs measurement on a reference signal received power (RSRP) of a reference signal transmitted in DL, a quality of a reference signal (RSRQ: reference signal received quality) and the like at a random time and is then able to make a periodic or even-triggered report of a corresponding measurement result to the base station.

Each user equipment reports a DL channel information in accordance with a DL channel status via uplink. A base station is then able to determine time/frequency resources, MCS (modulation and coding scheme) and the like appropriate for a data transmission to each user equipment using the DL channel information received from the each user equipment.

Such channel state information (CSI) may include CQI (Channel Quality Indication), PMI (Precoding Matrix Indicator), PTI (Precoder Type Indication) and/or RI (Rank Indication). In particular, the CSI may be transmitted entirely or partially depending on a transmission mode of each user equipment. CQI is determined based on a received signal quality of a user equipment, which may be generally determined on the basis of a measurement of a DL reference signal. In doing so, a CQI value actually delivered to a base station may correspond to an MCS capable of providing maximum performance by maintaining a block error rate (BLER) under 10% in the received signal quality measured by a user equipment.

This channel information reporting may be classified into a periodic report transmitted periodically and an aperiodic report transmitted in response to a request made by a base station.

In case of the aperiodic report, it is set for each user equipment by a 1-bit request bit (CQI request bit) contained in UL scheduling information downloaded to a user equipment by a base station. Having received this information, each user equipment is then able to deliver channel information to the base station via a physical uplink shared channel (PUSCH) in consideration of its transmission mode. And, it may set RI and CQI/PMI not to be transmitted on the same PUSCH.

In case of the periodic report, a period for transmitting channel information via an upper layer signal, an offset in the corresponding period and the like are signaled to each user equipment by subframe unit and channel information in consideration of a transmission mode of each user equipment may be delivered to a base station via a physical uplink control channel (PUCCH) in accordance with a determined period. In case that data transmitted in uplink simultaneously exists in a subframe in which channel information is transmitted by a determined period, the corresponding channel information may be transmitted together with the data not on the physical uplink control channel (PUCCH) but on a physical uplink shared channel (PUSCH). In case of the periodic report via PUCCH, bits (e.g., 11 bits) limited further than those of the PUSCH may be used. RI and CQI/PMI may be transmitted on the same PUSCH.

In case that contention occurs between the periodic report and the aperiodic report in the same subframe, only the aperiodic report can be performed.

In calculating Wideband CQI/PMI, a most recently transmitted RI may be usable. RI in a PUCCH CSI report mode is independent from RI in a PUSCH CSI report mode. The RI in the PUSCH CSI report mode is valid for CQI/PMI in the corresponding PUSCH CSI report mode only.

Table 16 is provided to describe CSI feedback type transmitted on PUCCH and PUCCH CSI report mode.

TABLE 16

| | | PMI Feedback Type | |
|---|---|---|---|
| | | No PMI (OL, TD, single-antenna) | Single PMI (CL) |
| CQI Feed back Type | Wideband | Model 1-0 RI (only for Open-Loop SM) One Wideband CQI (4 bit) when RI > 1, CQI of first codeword | Mode 1-1 RI Wideband CQI (4 bit) Wideband spatial CQI (3 bit) for RI > 1 Wideband PMI (4 bit) |

TABLE 16-continued

| | PMI Feedback Type | |
|---|---|---|
| | No PMI (OL, TD, single-antenna) | Single PMI (CL) |
| UE Selected | Mode 2-0<br>RI (only for Open-Loop SM)<br>Wideband CQI (4 bit)<br>Best-1 CQI (4 bit) in each BP<br>Best-1 indicator(L-bit label)<br>when RI > 1, CQI of first codeword | Mode 2-1<br>RI<br>Wideband CQI (4 bit)<br>Wideband spatial CQI (3 bit) for RI > 1<br>Wideband PMI (4 bit)<br>Best-1 CQI (4 bit) 1 in each BP<br>Best-1 spatial CQI (3 bit) for RI > 1<br>Best-1 indicator (L-bit label) |

Referring to Table 16, in the periodic report of channel information, there are 4 kinds of reporting modes (mode 1-0, mode 1-2, mode 2-0 and mode 2-1) in accordance with CQI and PMI feedback types.

CQI can be classified into WB (wideband) CQI and SB (subband) CQI in accordance with CQI feedback type and PMI can be classified into No PMI or Single PMI in accordance with a presence or non-presence of PMI transmission. In Table 11, No PMI corresponds to a case of open-loop (OL), transmit diversity (TD) and single-antenna, while Single PMI corresponds to a case of closed-loop (CL).

The mode 1-0 corresponds to a case that WB CQI is transmitted in the absence of PMI transmission. In this case, RI is transmitted only in case of open-loop (OL) spatial multiplexing (SM) and one WB CQI represented as 4 bits can be transmitted. If RI is greater than 1, CQI for a $1^{st}$ codeword can be transmitted.

The mode 1-1 corresponds to a case that a single PMI and WB CQI are transmitted. In this case, 4-bit WB CQI and 4-bit WB PMI can be transmitted together with RI transmission. Additionally, if RI is greater than 1, 3-bit WB (wideband) spatial differential CQI can be transmitted. In 2-codeword transmission, the WB spatial differential CQI may indicate a difference value between a WB CQI index for codeword 1 and a WB CQI index for codeword 2. The difference value in-between may have a value selected from a set $\{-4, -3, -2, -1, 0, 1, 2, 3\}$ and can be represented as 3 bits.

The mode 2-0 corresponds to a case that CQI on a UE-selected band is transmitted in the absence of PMI transmission. In this case, RI is transmitted only in case of open-loop spatial multiplexing (SM) and a WB CQI represented as 4 bits may be transmitted. A best CQI (best-1) is transmitted on each bandwidth part (BP) and the best-1 CQI may be represented as 4 bits. And, an L-bit indicator indicating the best-1 may be transmitted together. If the RI is greater than 1, a CQI for a $1^{st}$ codeword can be transmitted.

And, the mode 2-1 corresponds to a case that a single PMI and a CQI on a UE-selected band are transmitted. In this case, together with RI transmission, 4-bit WB CQI, 3-bit WB spiral differential CQI and 4-bit WB PMI can be transmitted. Additionally, 4-bit best-1 CQI is transmitted on each bandwidth part (BP) and L-bit best-1 indicator can be transmitted together. Additionally, if RI is greater than 1, 3-bit best-1 spatial differential CQI can be transmitted. In 2-codeword transmission, it may indicate a difference value between a best-1 CQI index of codeword 1 and a best-1 CQI index of codeword 2.

For the transmission modes, periodic PUCCH CSI report modes are supported as follows.

1) Transmission mode 1: Modes 1-0 and 2-0
2) Transmission mode 2: Modes 1-0 and 2-0
3) Transmission mode 3: Modes 1-0 and 2-0
4) Transmission mode 4: Modes 1-1 and 2-1
5) Transmission mode 5: Modes 1-1 and 2-1
6) Transmission mode 6: Modes 1-1 and 2-1
7) Transmission mode 7: Modes 1-0 and 2-0
8) Transmission mode 8: Modes 1-1 and 2-1 if a user equipment is set to make a PMI/RI reporting, or Modes 1-0 and 2-0 if a user equipment is set not to make a PMI/RI reporting
9) Transmission mode 9: Modes 1-1 and 2-1 if a user equipment is set to make a PMI/RI reporting and the number of CSI-RS ports is greater than 1, or Modes 1-0 and 2-0 if a user equipment is set not to make a PMI/RI reporting and the number of CSI-RS port(s) is equal to 1.

The periodic PUCCH CSIU reporting mode in each serving cell is set by upper layer signaling. And, the mode 1-1 is set to either submode 1 or submode 2 by an upper layer signaling using a parameter 'PUCCH_format1-1_CSI_reporting_mode'.

A CQI reporting in a specific subframe of a specific serving cell in a UE-selected SB CQI means a measurement of at least one channel state of a bandwidth part (BP) corresponding to a portion of a bandwidth of a serving cell. An index is given to the bandwidth part in a frequency increasing order starting with a lowest frequency without an increment of a bandwidth.

3. ACK/NACK Transmission Method Using PUCCH 3.1 ACK/NACK Transmission in LTE System Under the situation that a UE simultaneously transmits a plurality of ACKs/NACKs corresponding to multiple data units received from an eNB, in order to maintain the single-carrier property of ACK/NACK signals and reduce the total ACK/NACK transmission power, ACK/NACK multiplexing method based on PUCCH resource selection can be considered. With ACK/NACK multiplexing, contents of the ACK/NACK signals for multiple data units are identified by the combination of the PUCCH resource used in actual ACK/NACK transmission and the one of QPSK modulation symbols. For example, if it is assumed that one PUCCH resource carries 4 bits and 4 data units can be transmitted in maximum (at this time, assume that HARQ operation for each data unit can be managed by single ACK/NACK bit), the transmission (TX) node can identify the ACK/NACK result based on the transmission position of the PUCCH signal and the bits of the ACK/NACK signal as shown in Table 17 below.

TABLE 17

| HARQ-ACK(0), HARQ-ACK(1), HARQ-ACK(2), HARQ-ACK(3) | $n^{(1)}_{PUCCH}$ | b(0), b(1) |
|---|---|---|
| ACK, ACK, ACK, ACK | $n^{(1)}_{PUCCH,1}$ | 1, 1 |
| ACK, ACK, ACK, NACK/DTX | $n^{(1)}_{PUCCH,1}$ | 1, 0 |
| NACK/DTX, NACK/DTX, NACK, DTX | $n^{(1)}_{PUCCH,2}$ | 1, 1 |
| ACK, ACK, NACK/DTX, ACK | $n^{(1)}_{PUCCH,1}$ | 1, 0 |
| NACK, DTX, DTX, DTX | $n^{(1)}_{PUCCH,0}$ | 1, 0 |
| ACK, ACK, NACK/DTX, NACK/DTX | $n^{(1)}_{PUCCH,1}$ | 1, 0 |
| ACK, NACK/DTX, ACK, ACK | $n^{(1)}_{PUCCH,3}$ | 0, 1 |
| NACK/DTX, NACK/DTX, NACK/DTX, NACK | $n^{(1)}_{PUCCH,3}$ | 1, 1 |
| ACK, NACK/DTX, ACK, NACK/DTX | $n^{(1)}_{PUCCH,2}$ | 0, 1 |
| ACK, NACK/DTX, NACK/DTX, ACK | $n^{(1)}_{PUCCH,0}$ | 0, 1 |
| ACK, NACK/DTX, NACK/DTX, NACK/DTX | $n^{(1)}_{PUCCH,0}$ | 1, 1 |
| NACK/DTX, ACK, ACK, ACK | $n^{(1)}_{PUCCH,3}$ | 0, 1 |
| NACK/DTX, NACK, DTX, DTX | $n^{(1)}_{PUCCH,1}$ | 0, 0 |
| NACK/DTX, ACK, ACK, NACK/DTX | $n^{(1)}_{PUCCH,2}$ | 1, 0 |
| NACK/DTX, ACK, NACK/DTX, ACK | $n^{(1)}_{PUCCH,3}$ | 1, 0 |
| NACK/DTX, ACK, NACK/DTX, NACK/DTX | $n^{(1)}_{PUCCH,1}$ | 0, 1 |
| NACK/DTX, NACK/DTX, ACK, ACK | $n^{(1)}_{PUCCH,3}$ | 0, 1 |
| NACK/DTX, NACK/DTX, ACK, NACK/DTX | $n^{(1)}_{PUCCH,2}$ | 0, 0 |
| NACK/DTX, NACK/DTX, NACK/DTX, ACK | $n^{(1)}_{PUCCH,3}$ | 0, 0 |
| DTX, DTX, DTX, DTX | N/A | N/A |

In Table 17, HARQ-ACK(i) indicates the ACK/NACK result for the data unit i. For example, if a maximum of 4 data units is transmitted, i=0, 1, 2, 3. In Table 17, DTX means that there is no data unit transmitted for corresponding HARQ-ACK(i) or the reception (RX) node doesn't detect the existence of the data unit corresponding to HARQ-ACK(i).

In addition, $P_{PUCCH,x}^{(1)}$ indicates the PUCCH resource which should be used in actual ACK/NACK transmission, if there are 4 PUCCH resources, a maximum of four PUCCH resources $n_{PUCCH,0}^{(1)}$, $n_{PUCCH,1}^{(1)}$, $n_{PUCCH,2}^{(1)}$ and $n_{PUCCH,3}^{(1)}$ may be allocated to the UE.

In addition, b(0),b(1) indicates two bits carried by the selected PUCCH resource. Modulation symbols which are transmitted through PUCCH resource are decided according to the bits. For example, if the RX node receives and decodes 4 data units successfully, the RX node should transmit two bits, (1, 1), using PUCCH resource $n_{PUCCH,1}^{(1)}$. For another example, if the RX node receives 4 data units and fails in decoding the first and the third data units (corresponding to HARQ-ACK(0) and HARQ-ACK(2)), the RX node should transmit (1, 0) using $n_{PUCCH,3}^{(1)}$.

By linking the actual ACK/NACK contents with the combination of PUCCH resource selection and the actual bit contents in the transmitted PUCCH resource in this way, ACK/NACK transmission using a single PUCCH resource for multiple data units is possible.

In ACK/NACK multiplexing method (see Table 17), basically, NACK and DTX are coupled as NACK/DTX if at least one ACK exists for all data units. This is because combinations of PUCCH resources and QPSK symbols are insufficient to cover all ACK, NACK and DTX hypotheses. On the other hand, for the case that no ACK exists for all data units (in other words, NACK or DTX only exists for all data units), single NACK decoupled with DTX is defined one as HARQ-ACK(i). In this case, PUCCH resource linked to the data unit corresponding to single NACK can be also reserved to transmit the signal of multiple ACKs/NACKs.

3.2 ACK/NACK Transmission in LTE-A System

In an LTE-A system (e.g., Rel-10, 11, 12, etc.), transmission of a plurality of ACK/NACK signals for a plurality of PDSCH signals, which is transmitted via a plurality of DL CCs, via a specific UL CC is considered. Unlike ACK/NACK transmission using PUCCH format 1a/1b of an LTE system, a plurality of ACK/NACK signals may be subjected to channel coding (e.g., Reed-Muller coding, Tail-biting convolutional coding, etc.) and then a plurality of ACK/NACK information/signals may be transmitted using PUCCH format 2 or a new PUCCH format (e.g., an E-PUCCH format) modified based on block spreading.

Figure 17:
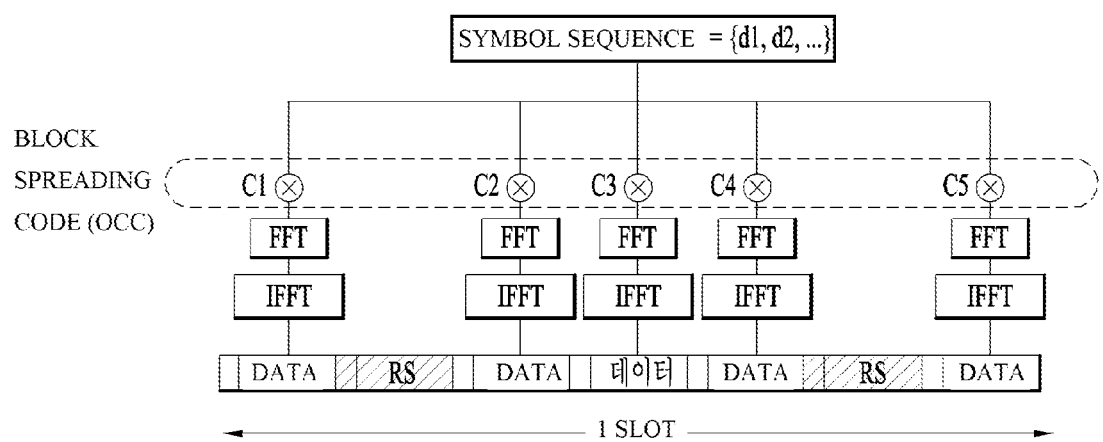
FIG. 17 is a diagram showing an example of a new PUCCH format based on block spreading.

FIG. 17 shows an example of a new PUCCH format based on block spreading.

A block spreading scheme refers to a method for performing modulation using an SC-FDMA scheme unlike PUCCH format series 1 or 2 in an LTE system. The block spreading scheme refers to a scheme for time-domain spreading and transmitting a symbol sequence using an orthogonal cover code (OCC) as shown in FIG. 17. That is, the symbol sequence is spread using the OCC to multiplex control signals of several UEs in the same RB.

In the above-described PUCCH format 2, one symbol sequence is transmitted over the time domain and UE multiplexing is performed using cyclic shift (CCS) of a CAZAC sequence. However, in the new PUCCH format based on block spreading, one symbol sequence is transmitted over the frequency domain and UE multiplexing is performed using time-domain spreading based on an OCC.

For example, as shown in FIG. 17, one symbol sequence may be generated as five SC-FDMA symbols by an OCC of length-5 (that is, SF=5). Although a total of 2 RS symbols is used during one slot in FIG. 17, various methods using three RS symbols and using an OCC of SF=4 may be used. At this time, the RS symbols may be generated from a CAZAC sequence having specific cyclic shift and may be transmitted in the form in which a specific OCC is applied (multiplied by) to a plurality of RS symbols of the time domain.

In the embodiments of the present invention, for convenience of description, a multi-ACK/NACK transmission scheme based on channel coding using PUCCH format 2 or a new PUCCH format (e.g., an E-PUCCH format) is defined as a "multi-bit ACK/NACK coding transmission method".

The multi-bit ACK/NACK coding method refers to a method for transmitting ACK/NACK code blocks generated by channel-coding ACK/NACK or DTX information (meaning that the PDCCH is not received/detected) for PDSCH signals transmitted on a plurality of DL CCs.

For example, when the UE operates on a certain DL CC in an SU-MIMO mode and receives two codewords (CW), the UE may have a maximum of five feedback states including a total of four feedback states of each CW, such as ACK/ACK, ACK/NACK, NACK/ACK and NACK/NACK, and DTX. When the UE receives a single CW, the UE may have a maximum of three states including ACK, NACK and/or DTX. When NACK and DTX are equally processed, the UE may have a total of two states such as ACK and NACK/DTX.

Accordingly, when the UE aggregates a maximum of five DL CCs and the UE operates on all DL CCs in an SU-MIMO mode, the UE may have a maximum of 55 transmittable feedback states. At this time, the size of ACK/NACK payload representing the 55 feedback states may be a total of 12 bits. If DTX and NACK are equally processed, the number of feedback states becomes 45 and the size of the ACK/NACK payload representing the feedback states is a total of 10 bits.

In an ACK/NACK multiplexing (that is, ACK/NACK selection) method applied to an LTE TDD system, fundamentally, an implicit ACK/NACK selection method in which an implicit PUCCH resource corresponding to a PDCCH scheduling each PDSCH (that is, linked to a smallest CCE index) is used for ACK/NACK transmission in order to secure a PUCCH resource of each UE.

In an LTE-A FDD system, transmission of a plurality of ACK/NACK signals for a plurality of PDSCH signals transmitted via a plurality of DL CCs via one UE-specific UL CC is considered. "ACK/NACK selection" methods using an implicit PUCCH resource linked to a PDCCH scheduling some or all DL CCs (that is, linked to a smallest CCE index nCCE or linked to nCCE and nCCE+1) or a combination of an implicit PUCCH and an explicit PUCCH resource pre-allocated to each UE via RRC signaling are considered.

Even in an LTE-A TDD system, aggregation of a plurality of CCs is considered. For example, when a plurality of CCs is aggregated, UE transmitting a plurality of ACK/NACK information/signals for a plurality of PDSCH signals transmitted via a plurality of DL subframes and a plurality of CCs via a specific CC (that is, A/N CC) in UL subframes corresponding to the plurality of DL subframes in which the PDSCH signals are transmitted is considered.

At this time, unlike LTE-A FDD, a method (that is, full ACK/NACK) for transmitting a plurality of ACK/NACK signals corresponding to a maximum number of CWs, which may be transmitted via all CCs allocated to the UE, for a plurality of DL subframes may be considered or a method (that is, bundled ACK/NACK) for applying ACK/NACK bundling to a CW, CC and/or a subframe region, reducing the number of transmitted ACKs/NACKs and performing transmission may be considered.

At this time, CW bundling means that ACK/NACK bundling for CW per CC is applied to each DL subframe and CC bundling means that ACK/NACK bundling for all or some CCs is applied to each DL subframe. In addition, subframe bundling means that ACK/NACK bundling for all or some DL subframes is applied to each CC.

As the subframe bundling method, an ACK counter method indicating a total number of ACKs (or the number of some ACKs) per CC for all PDSCH signals or DL grant PDCCHs received on each DL CC may be considered. At this time, the multi-bit ACK/NACK coding scheme or the ACK/NACK transmission scheme based on the ACK/NACK selection method may be configurably applied according to the size of the ACK/NACK payload per UE, that is, the size of the ACK/NACK payload for transmission of full or bundled ACK/NACK configured per UE.

4. ACK/NACK Signal Transmission Method Via PUCCH in Small Cell Environment 4.1 Small Cell Environment The term "cell" described in the embodiments of the present invention may fundamentally include downlink resources and optionally include uplink resources (see Chapter 2.1). At this time, linkage between carrier frequency for downlink resources and carrier frequency for uplink resources is specified in system information (SI) delivered via downlink resources.

In addition, the term "cell" means a specific frequency region or a specific geographical region as coverage of an eNB. The term "cell may have the same meaning as the eNB supporting specific coverage, for convenience of description. For example, a macro eNB and a macro cell may be used as the same meaning and a small base station and a small cell may be used as the same meaning. The terms cell and base station may have respective original meanings upon being explicitly distinguished.

In a next-generation wireless communication system, in order to more stably secure a data service such as multimedia, interest in introduction of a hierarchical cell structure in which a micro cell, a pico cell and/or a femto cell, all of which are small cells for low-power/short-range communication, are mixed or a heterogeneous cell structure to a homogeneous network based on a macro cell has increased. This is because additional installation of a macro cell in an existing eNB can improve system performance but is not efficient in terms of cost and complexity.

Assume that the term "cell" applied to the following embodiments refers to a small cell unless stated otherwise. However, the present invention is applicable to a cell (e.g., a macro cell) used in a general cellular system.

4.2 Multi-Connectivity Mode

In the embodiments of the present invention, a new connectivity mode is proposed. That is, a multi-connectivity mode in which a UE is simultaneously connected to two or more cells is proposed. The UE may be simultaneously connected to a plurality of cells having the same downlink carrier frequency or different downlink carrier frequencies in the multi-connectivity mode. The multi-connectivity mode may be referred to as a multi-connection mode, a new connectivity mode or a new connection mode as the connection mode newly proposed in the embodiments of the present invention.

The multi-connectivity mode means that the UE may be simultaneously connected to a plurality of cells. Hereinafter, for convenience of description, assume that the UE is connected to two cells. The present invention is equally applicable to the case in which the UE is connected to three or more cells.

For example, the UE may simultaneously receive services from a first cell and a second cell. At this time, the UE may receive functionalities (e.g., connection management, mobility management) provided by a control plane (C-plane) via the first cell and the second cell.

In addition, the UE may perform carrier aggregation (CA) with two or more cells. For example, the first cell may use n (n being an arbitrary positive integer) arbitrary carriers and the second cell may use k (k being an arbitrary positive integer) arbitrary carriers. At this time, the carriers of the first cell and the second cell are the same frequency carriers or different frequency carriers. For example, the first cell may use F1 and F2 frequency bands and the second cell may use F2 and F3 frequency bands.

A plurality of cells may physically exist in the same position or different positions. At this time, assume that the plurality of cells is connected to each other via a backhaul but the backhaul is a non-ideal backhaul via which it is difficult to share scheduling information or data of a specific UE due to very large transmission delay.

In the embodiments of the present invention, assume that the cell is a small cell. For example, as an environment in which the small cell is arranged, a hot spot of a city may be considered. That is, since a plurality of small cells is arranged in a specific region, assume that a difference in timing advance (TA) value between small cells, to which the UE is simultaneously connected, is small. That is, under a specific condition, several small cells may simultaneously receive the signal transmitted by the UE.

In the multi-connectivity mode, the UE may receive synchronization signals from a plurality of small cells and maintain downlink synchronization. In addition, the UE may receive several control signals such as PDCCH signals from the plurality of small cells and simultaneously or separately receive PDSCH signals, which are data, from the plurality of small cells. The UE may include one or more receivers for receiving data from the plurality of small cells. As such receivers, a minimum mean square error-interference rejection combining (MMSE-IRC) receiver for efficiently eliminating interference among the plurality of cells may be used.

The UE may notify each cell of information about receiver performance in an initial cell connection step of each cell.

The signal received via the MMSE-IRC receiver may be expressed as shown in Equation 4 below. At this time, a system using $N_{TX}$ transmit antennas and $N_{RX}$ receive antennas is assumed.

$$r(k, l) = H_1(k, l)d_1(k, l) + \sum_{j=2}^{N_{BS}} H_j(k, l)d_j(k, l) + n(k, l) \qquad \text{Equation 4}$$

In Equation 4, k means a k-th subcarrier of a specific subframe and l means an l-th OFDM symbol. In Equation 5 below, $H_1(k,l)d_1(k,l)$ denotes a preferred signal received by the UE and $H_j(k,l)d_j(k,l)$ denotes an interference signal transmitted from a j-th (j>1) eNB. At this time, $H_1(k,l)$ and $H_j(k,l)$ respectively mean estimated radio channels, $d_j(k,l)$ denotes a $N_{Tx} \times 1$ transmission data vector and n(k,l) denotes noise. $\hat{d}_l(k,l)$ is a restored data signal when rank is $N_{stream}$ and may be expressed as shown in Equation 5 below.

$$\hat{d}_l(k,l) = W_{RX,1}(k,l)r(k,l) \qquad \text{Equation 5}$$

In Equation 5, $W_{RX,1}(k,l)$ denotes a $N_{stream} \times N_{Rx}$ receiver weight matrix. In the MMSE-IRC receiver, $W_{RX,1}(k,l)$ may be computed as shown in Equation 6 below.

$$W_{RX,1}(k,l) = \hat{H}_l^H(k,l)R^{-1} \qquad \text{Equation 6}$$

At this time, R may be computed using a transmitted DM-RS as shown in Equation 7 below.

$$R = P_1 \hat{H}_1(k, l) \hat{H}_1^H(k, l) + \frac{1}{N_{sp}} \sum_{k,l \in DM-RS} \tilde{r}(k, l)\tilde{r}(k, l)^H \qquad \text{Equation 7}$$

$$\tilde{r}(k, l) = r(k, l) - \hat{H}_l(k, l)d_1(k, l)$$

In Equation 7, $\hat{H}_l^H(k,l)$ denotes an estimated radio channel, $N_{sp}$ denotes the number of samples of the DM-RS, and P1 denotes transmit power. In addition, r(k,l) denotes a transmitted DM-RS and $\tilde{r}(k,l)$ denotes an estimated DM-RS.

4.3 ACK/NACK Transmission Method in Small Cell Environment

In the embodiments of the present invention, small cells for performing scheduling for data transmission and reception to and from a UE in a multi-connectivity mode are connected via a non-ideal backhaul. Accordingly, it is difficult to share scheduling information of the UE between the small cells in real time. In addition, ACK/NACK signals to be transmitted by the UE may be individually transmitted to the small cells for performing scheduling. In the multi-connectivity mode, the UE may maintain connection with two or more small cells. For convenience of description, assume that connection with two small cells is maintained.

For example, the UE may transmit an ACK/NACK signal for a PDSCH signal transmitted from a specific small cell using a physical cell ID (PCI) of the small cell. That is, the UE may transmit the ACK/NACK for a first PDSCH signal transmitted from a first small cell using the PCI of the first small cell and transmit the ACK/NACK for a PDSCH signal transmitted from a second small cell using the PCI of the second small cell.

At this time, radio resources specified by each small cell may be used as radio resources used to transmit the ACK/NACK at the UE. However, since the two small cells cannot share scheduling information, the two cells schedule a PDSCH region to the UE in the same subframe. In this case, the UE should transmit, to the two cells, the respective ACK/NACK signals for the two cells in the same subframe.

In this case, using the ACK/NACK resources specified by the cells, two ACKs/NACKs may be transmitted. This may deteriorate PAPR or cubic metric (CM) performance, thereby deteriorating power saving performance of the UE.

Accordingly, when the ACK/NACK signals for the two small cells are transmitted using one ACK/NACK resource region known to the two small cells, deterioration in PAPR or CM performance may be avoided.

The small cells in the multi-connectivity mode cannot share scheduling information in real time because the small cells are connected via the non-ideal backhaul, but can share uplink and/or downlink control information when entering the multi-connectivity mode or periodically. For example, in order to transmit downlink control information without collision in the multi-connectivity mode, the PDCCH and/or E-PDCCH regions for the small cells may be allocated not to overlap. In addition, in the multi-connectivity mode, the small cells may share PDSCH resource information and the UE may predefine the PUCCH region and the PUSCH region for transmitting UCI.

Hereinafter, a method for transmitting ACK/NACK signals for two small cells at a UE in a multi-connectivity mode using one ACK/NACK resource region will be described.

Figure 18:
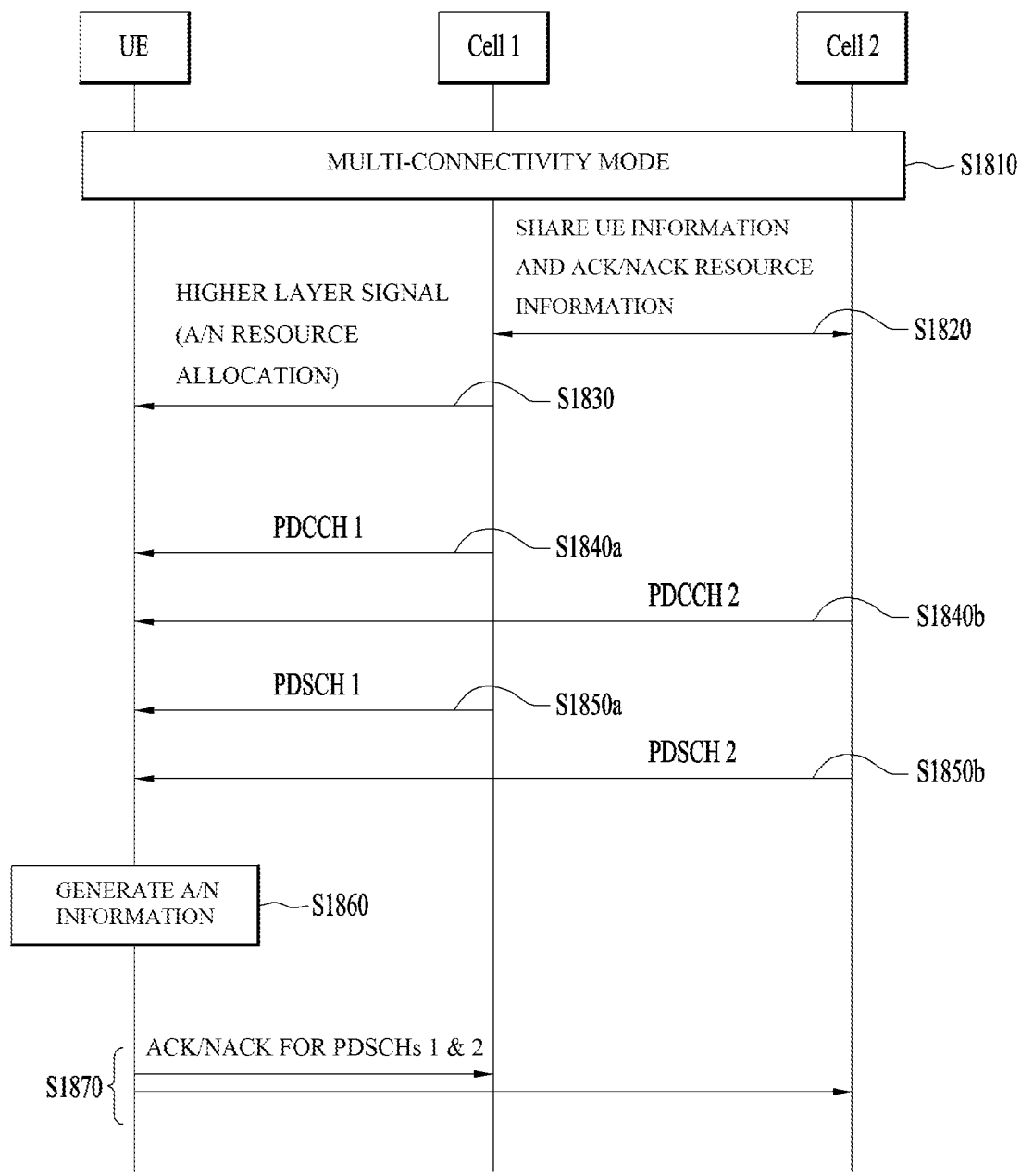
FIG. 18 is a diagram showing one method for transmitting an ACK/NACK signal at a UE in a multi-connectivity mode.

FIG. 18 is a diagram showing one method for transmitting an ACK/NACK signal at a UE in a multi-connectivity mode.

Referring to FIG. 18, assume that a UE, a first cell (Cell 1) and a second cell (Cell 2) are in the multi-connectivity mode. That is, the UE is connected to the first cell and the second cell and may individually receive scheduling from the first cell and the second cell. In addition, assume that the first cell and the second cell are small cells (S1810).

Since the first cell and the second cell should allocate the ACK/NACK resource regions to each UE, many ACK/NACK resources are likely to be required. Accordingly, the cells may set a predetermined number of UEs as one group and perform scheduling such that the UE group uses the same ACK/NACK resources, thereby preventing excessive use of ACK/NACK resources. Of course, if the number of UEs is small, ACK/NACK resources may be allocated to each UE.

In FIG. 18, the first cell and the second cell should share information on a UE, a UE group and UEs belonging to a UE group. In addition, when UEs belonging to a specific UE group are simultaneously scheduled, excessive scheduling of ACK/NACK resources cannot be avoided. Therefore, the cells may also share information on the scheduling time of the UE group via a wired or wireless link. In addition, the cells may share resource allocation information of the ACK/NACK resources to be allocated to each UE or UE group (S1820).

In step S1820, the cells in the multi-connectivity mode may pre-share information on a PDCCH region (e.g., CCE, etc.), information on an E-PDCCH region, PDSCH resource information, etc. in addition to UE information and ACK/NACK resource information. At this time, the ACK/NACK resource information means information on an uplink control channel region in which uplink control information (UCI) will be transmitted.

The first cell and/or the second cell may transmit, to the UE, ACK/NACK resource allocation information allocated to the UE via a higher layer signal. At this time, the ACK/NACK resource allocation information may be configured to indicate the same resource region (e.g., the same PUCCH resource region) in the first cell and the second cell (S1830).

Thereafter, when downlink data needs to be transmitted to the UE, the first cell may transmit a first PDCCH signal to the UE to allocate a PDSCH region. In addition, when the second cell needs to transmit downlink data, the second cell may transmit a second PDCCH signal to the UE to allocate a PDSCH region (S1840a, 1840b).

In steps S1840a and S1840b, the CCE resources used to transmit the first PDCCH signal and the second PDCCH may be pre-configured by the first cell and the second cell so as not to overlap. In addition, the first PDCCH signal and the second PDCCH may be E-PDCCH signals. In this case, the first cell and the second cell may configure different monitoring sets such that the E-PDCCH signals transmitted from the cells do not overlap.

The UE may receive a first PDSCH and a second PDSCH from the small cells via the PDSCH region to which the first PDCCH signal and the second PDCCH signal are allocated (S1850a, S1850b).

If steps S1840a and S1840b are performed in different subframes, the UE transmits the ACK/NACK signals to the small cells in different subframes via PUCCH resources associated with the PDCCH signals. However, if steps S1840a and S1840b are performed in the same subframe, the amount of ACK/NACK signals to be transmitted by the UE in the same subframe increases, thereby causing excessive power consumption of the UE and CM deterioration.

Accordingly, in this case, the UE may multiplex the ACK/NACK information of the first PDSCH signal of the first cell and the second PDSCH signal of the second cell to generate one ACK/NACK signal (S1860).

Thereafter, the UE may transmit the ACK/NACK signal generated in step S1860 via the ACK/NACK resource region indicated by the ACK/NACK resource allocation information received in step S1830. At this time, the first cell and the second cell are small cells and are in the multi-connectivity mode. In addition, since the ACK/NACK resource allocation information indicates one resource region, the ACK/NACK signal transmitted by the UE may be received by both the first cell and the second cell (S1870).

Since the ACK/NACK signal transmitted by the UE includes the ACK/NACK information of both the first cell and the second cell, the first cell and the second cell may extract and use only ACK/NACK information respectively corresponding thereto. That is, although the ACK/NACK signals are shown as being respectively transmitted to the first cell and the second cell in FIG. 18, the UE actually transmits one ACK/NACK signal via the allocated PUCCH resource region.

Although the embodiments of the present invention are described based on an FDD system, a similar method is applicable to a TDD system. Although two cells are assumed in FIG. 18 for convenience of description, three or more small cells may be in the multi-connectivity mode.

Hereinafter, methods for generating and transmitting ACK/NACK information (that is, ACK/NACK signal) for two or more cells configuring a multi-connectivity mode will be described in detail.

4.4 ACK/NACK Signal Transmission Method Using PUCCH Format 1b Channel Selection

Table 18 below shows a mapping relationship between small cells for transmitting ACK/NACK and ACK/NACK bits according to the number of ACKs/NACKs simultaneously transmitted by the UE. In FIG. 18, a TB (transport block) means a data block transmitted via a PDSCH. In case of MIMO transmission, the UE may simultaneously transmit two TBs via the PDSCH. In Table 18, a first serving cell (serving cell 1) and a second serving cell (serving cell 2) perform scheduling, determine the ACK/NACK resource region before starting PDSCH signal transmission, and signal the ACK/NACK resource region to the UE.

TABLE 18

| Number (N) of ACKs/NACKs | HARQ-ACK(j) | | | |
|---|---|---|---|---|
| | HARQ-ACK(0) | HARQ-ACK(1) | HARQ-ACK(2) | HARQ-ACK(3) |
| 2 | TB1 serving cell 1 | TB1 serving cell 2 | N/A | N/A |
| 3 | TB1 serving cell 1 | TB2 serving cell 1 | TB1 serving cell 2 | N/A |
| 4 | TB1 serving cell 1 | TB2 serving cell 1 | TB1 serving cell 2 | TB2 serving cell 2 |

The resource region to be used upon transmitting the ACK/NACK signal may be pre-determined before the two cells perform PDSCH transmission. The allocation information of the resource region may be shared between the two cells via a wired or wireless link. One or both of the two cells may signal the ACK/NACK resource region to the UE.

In the embodiments of the present invention, an acknowledgement resource indicator (ARI) used to indicate the ACK/NACK resource region may not be used in the downlink control channel. In this case, the ARI field may be used for TPC or the other purposes.

Table 19 below shows an example of a PUCCH format 1b channel selection method when the number N of ACKs/NACKs to be transmitted by the UE is 2.

TABLE 19

| HARQ-ACK(0) | HARQ-ACK(1) | PUCCH resource | b(0)b(1) |
|---|---|---|---|
| A | A | n1 | 1, 1 |
| A | N/D | n1 | 1, 0 |
| N/D | A | n1 | 0, 1 |
| N | N/D | n1 | 0, 0 |
| D | N/D | No transmission | |

In Table 19, "A" denotes ACK, "N" denotes NACK, and "D" denotes DTX. In addition, HARQ-ACK(0) denotes an ACK/NACK result for the first cell and HARQ-ACK(1) denotes an ACK/NACK result for the second cell. According to Table 19, when N=2, "PUCCH resource n1" meaning PUCCH resource may be allocated to the UE by a higher layer (see step S1830 of FIG. 18) and ACK/NACK bits may be modulated using a QPSK modulation scheme.

Accordingly, when the UE transmits ACK/NACK bits (1, 0) via PUCCH resource region n1, the first cell may confirm that the first PDSCH signal transmitted thereby has been successfully received and the second cell may confirm that an error has occurred in the second PDSCH signal transmitted thereby. That is, each cell may selectively acquire ACK/NACK information of the PDSCH scheduled thereby according to the contents of the ACK/NACK signal and the reception position of the ACK/NACK signal.

In addition, in Table 19, when the ACK/NACK information of the first cell is "D" and the ACK/NACK information of the second cell is "N/D", the UE does not transmit data via allocated PUCCH resource n1. In this case, the first cell and the second cell may estimate that the PDSCH signals respectively transmitted thereby are respectively DTX and DTX or NACK.

For the received ACK/NACK signals, the small cells may selectively acquire the ACK/NACK information of the PDSCH signals scheduled thereby based on Table 19.

Table 20 below shows another example of a PUCCH format 1b channel selection method when the number N of ACKs/NACKs to be transmitted by the UE is 2.

TABLE 20

| HARQ-ACK(0) | HARQ-ACK(1) | PUCCH resource | b(0)b(1) |
|---|---|---|---|
| A | A | n1 | 1, 1 |
| A | N/D | n1 | 1, 0 |
| N/D | A | n1 | 0, 1 |
| N/D | N | n1 | 0, 0 |
| N | N/D | n1 | 0, 0 |
| D | D | | No transmission |

Table 20 is equal to Table 19 except that, when the ACK/NACK information of each small cell is DTX, PUCCH transmission is not performed. In case of Table 20, instead of on-off keying of ACK/NACK information transmission of HARQ-ACK(1), QPSK transmission becomes possible, thereby improving ACK/NACK transmission performance as compared to Table 19.

This is because the first cell and the second cell exist at different physical and geographic positions and a difference between "D" and "N" may be large. In the embodiments of the present invention, the first cell and the second cell do not mutually know UE scheduling information thereof and thus individually perform ACK/NACK detection according to scheduling performed thereby. In this case, when Table 19 is used without change, N/D becomes "No transmission" in case of HARQ-ACK(1) and the second cell should perform DTX detection. Therefore, the performance of the second cell may deteriorate. However, as shown in Table 20, in a state in which "No transmission" is set only when the second cell does not perform scheduling, when the second cell performs DTX detection, BPSK detection of ACK/NACK becomes possible and thus the performance of the second cell may be improved.

Table 21 below shows another example of a PUCCH format 1b channel selection method when the number N of ACKs/NACKs to be transmitted by the UE is 2.

TABLE 21

| HARQ-ACK(0) | HARQ-ACK(1) | PUCCH resource | b(0)b(1) |
|---|---|---|---|
| A | A | n2 | 1, 1 |
| A | N/D | n1 | 1, 1 |
| N/D | A | n2 | 0, 0 |
| N/D | N | n1 | 0, 0 |
| N | N/D | n1 | 0, 0 |
| D | D | | No transmission |

Table 21 shows the case in which two PUCCH resources n1 and n2 are allocated in an environment in which two small cells are in a multi-connectivity mode. That is, when N=2, PUCCH resources n1 and n2 may be allocated to the UE by a higher layer and ACK/NACK bits are transmitted using a QPSK modulation scheme.

In Table 21, since HARQ-ACK(i) information is identified according to the resource region, two bits included in the ACK/NACK signal may be expressed by one bit. For example, when the ACK/NACK signal is received via PUCCH resource n1 and the ACK/NACK information indicates "1", the first cell can confirm that the first PDSCH signal has been successfully received and the second cell can confirm that an error has occurred in the second PDSCH signal. In contrast, when the ACK/NACK signal is received via PUCCH resource n2 and the ACK/NACK information indicates "0", the first cell can confirm that an error has occurred in the first PDSCH signal and the second cell can confirm that the second PDSCH signal has been successfully received.

In this way, each small cell may selectively acquire ACK/NACK information of the PDSCH signal scheduled thereby based on Table 21, for the received ACK/NACK signal.

Table 22 below shows an example of a PUCCH format 1b channel selection method when the number N of ACKs/NACKs to be transmitted by the UE is 3.

TABLE 22

| HARQ-ACK(0) | HARQ-ACK(1) | HARQ-ACK(2) | PUCCH resource | b(0)b(1) |
|---|---|---|---|---|
| A | A | A | n2 | 1, 1 |
| A | N/D | A | n2 | 1, 0 |
| N/D | A | A | n2 | 0, 1 |
| N | N/D | A | n3 | 0, 0 |
| A | A | N/D | n1 | 1, 1 |
| A | N/D | N/D | n1 | 1, 0 |
| N/D | A | N/D | n1 | 0, 1 |
| N/D | N/D | N | n3 | 0, 0 |
| N | N/D | D | n1 | 0, 0 |
| N/D | N | D | n1 | 0, 0 |
| D | D | D | | No transmission |

According to Table 22, when N=3, PUCCH resources n1, n2 and n3 may be allocated to the UE by a higher layer. At this time, ACK/NACK information bits are transmitted using a QPSK modulation scheme.

Table 22 may be used when the number of small cells configuring the multi-connectivity mode is 3, when the number of small cells is 2 and the number of component carriers configured in each small cell is 3, or when the number of ACKs/NACKs to be transmitted by the UE is 3 regardless of the number of small cells. Each small cell may selectively acquire ACK/NACK information of the PDSCH signal scheduled thereby based on Table 22, for the transmitted ACK/NACK signal.

Table 23 below shows an example of a PUCCH format 1b channel selection method when the number N of ACKs/NACKs to be transmitted by the UE is 4.

TABLE 23

| HARQ-ACK(0) | HARQ-ACK(1) | HARQ-ACK(2) | HARQ-ACK(3) | PUCCH resource | b(0)b(1) |
|---|---|---|---|---|---|
| A | A | A | A | n2 | 1, 1 |
| A | N/D | A | A | n3 | 0, 1 |
| N/D | A | A | A | n2 | 0, 1 |
| N/D | N/D | A | A | n4 | 1, 1 |
| A | A | A | N/D | n2 | 1, 0 |
| A | N/D | A | N/D | n3 | 0, 0 |
| N/D | A | A | N/D | n2 | 0, 0 |
| N/D | N/D | A | N/D | n4 | 1, 0 |
| A | A | N/D | A | n3 | 1, 1 |
| A | N/D | N/D | A | n3 | 1, 0 |
| N/D | A | N/D | A | n4 | 0, 1 |
| N/D | N/D | N/D | A | n4 | 0, 0 |
| A | A | N/D | N/D | n1 | 1, 1 |
| A | N/D | N/D | N/D | n1 | 1, 0 |
| N/D | A | N/D | N/D | n1 | 0, 1 |
| N/D | N | N/D | N/D | n1 | 0, 0 |
| N | N/D | N/D | N/D | n1 | 0, 0 |
| D | D | N/D | N/D | | No transmission |

According to Table 23, when N=4, PUCCH resources n1, n2, n3 and n4 may be allocated to the UE by a higher layer. At this time, ACK/NACK information bits are transmitted using a QPSK modulation scheme.

Table 23 may be used when the number of small cells configuring the multi-connectivity mode is 4, when the number of small cells is 2 and the number of component carriers configured in each small cell is 4, or when the number of ACKs/NACKs to be transmitted by the UE is 4 regardless of the number of small cells. Each small cell may selectively acquire ACK/NACK information of the PDSCH signal scheduled thereby based on Table 23, for the transmitted ACK/NACK signal.

Table 24 below shows another example of a PUCCH format 1b channel selection method when the number N of ACKs/NACKs to be transmitted by the UE is 4.

TABLE 24

| HARQ-ACK(0) | HARQ-ACK(1) | HARQ-ACK(2) | HARQ-ACK(3) | PUCCH resource | b(0)b(1) |
|---|---|---|---|---|---|
| A | A | A | A | n2 | 1, 1 |
| A | N/D | A | A | n3 | 0, 1 |
| N/D | A | A | A | n2 | 0, 1 |
| N/D | N/D | A | A | n4 | 1, 1 |
| A | A | A | N/D | n2 | 1, 0 |
| A | N/D | A | N/D | n3 | 0, 0 |
| N/D | A | A | N/D | n2 | 0, 0 |
| N/D | N/D | A | N/D | n4 | 1, 0 |
| A | A | N/D | A | n3 | 1, 1 |
| A | N/D | N/D | A | n3 | 1, 0 |
| N/D | A | N/D | A | n4 | 0, 1 |
| N/D | N/D | N/D | A | n4 | 0, 0 |
| A | A | N/D | N/D | n1 | 1, 1 |
| A | N/D | N/D | N/D | n1 | 1, 0 |
| N/D | A | N/D | N/D | n1 | 0, 1 |
| N/D | N | N/D | N/D | n1 | 0, 0 |
| N/D | N/D | N/D | N | n1 | 0, 0 |
| N/D | N/D | N | N/D | n1 | 0, 0 |
| N | N/D | N/D | N/D | n1 | 0, 0 |
| D | D | D | D | No transmission | |

Table 24 is equal to Table 23 except that "No transmission" is set so as not to perform PUCCH transmission only when the ACK/NACK information of each small cell is DTX. In Table 24, when ACK/NACK information of HARQ-ACK(2) and HARQ-ACK(3) is transmitted, QPSK transmission is possible instead of on-off keying, thereby improving ACK/NACK transmission performance.

According to Table 24, when N=4, PUCCH resources n1, n2, n3 and n4 may be allocated to the UE by a higher layer. At this time, ACK/NACK information bits are transmitted using a QPSK modulation scheme. Each small cell may selectively acquire ACK/NACK information of the PDSCH signal scheduled thereby based on Table 24, for the transmitted ACK/NACK signal.

4.5 ACK/NACK Signal Transmission Method Using PUCCH Format 3

4.5.1 Method of Using Two RM Encoders

Even when PUCCH format 3 is used, the ACK/NACK resource region used to transmit the ACK/NACK signal may be predetermined by the small cells as shown in FIG. 18. However, when PUCCH format 3 is used, more information bits may be transmitted as compared to when PUCCH format 1b is used.

Figure 19:
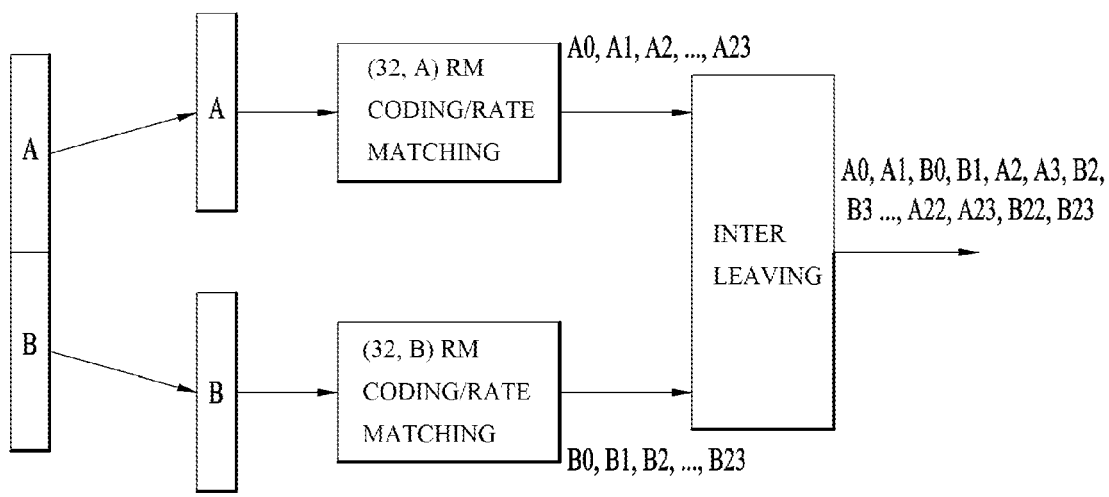
FIG. 19 is a diagram showing one method for configuring ACK/NACK information using two RM encoders in order to use PUCCH format 3.

FIG. 19 is a diagram showing one method for configuring ACK/NACK information using two RM encoders in order to use PUCCH format 3.

The description of FIG. 19 fundamentally follows the description of FIG. 16. However, in FIG. 19, "A" denotes ACK/NACK information bits for a first small cell input to a first RM encoder and "B" denotes ACK/NACK information bits for a second small cell input to a second RM encoder. That is, the UE arranges the ACK/NACK information bits for the first cell (cell 1) in "A" to perform RM coding corresponding to (32, A) and arranges the ACK/NACK information bits for the second cell (cell 2) in "B" to perform RM coding corresponding to (32, B). Thereafter, a total RM-encoded bit streams is interleaved to generate an ACK/NACK signal (see step S1860). Thereafter, the UE transmits the generated ACK/NACK signal via a pre-allocated PUCCH region.

Each small cell deinterleaves a received ACK/NACK information bit stream and then acquires an encoded bit stream for the ACK/NACK bits corresponding thereto. Thereafter, each small cell may perform RM decoding to acquire ACK/NACK information.

A small cell, which does not transmit a PDSCH signal, inputs an information bit stream corresponding to NACK to the input terminal of the RM coding unit. Accordingly, the RM-encoded information bit stream becomes "0" and is input to the input terminal of the interleaver. That is, the same result as setting all parts corresponding to the information bit stream to "0" is obtained in the output terminal of the interleaver.

For example, when the second small cell does not transmit the PDSCH signal but the first small cell transmits the PDSCH signal, the UE performs only (32, A) RM coding with respect to the ACK/NACK information bits for the first small cell. In contrast, when the first small cell does not transmit the PDSCH signal, the UE performs only (32, B) RM coding with respect to the ACK/NACK information bits for the second small cell.

4.5.2 Method of Using One RM Encoder.

A method for configuring PUCCH format 3 using a method different from the method described in Chapter 4.5.1 will now be described.

The UE may concatenate ACK/NACK information bits for the first small cell and ACK/NACK information bits for the second small cell, perform RM encoding using two RM encoders as shown in FIG. 19 when the length of the concatenated information bits is equal to or greater than 11 bits and perform RM encoding using one RM encoder when the length of the concatenated information bits is less than 11 bits.

In an environment in which it is difficult for small cells configuring the multi-connectivity mode to share scheduling information of the UE, in order to accurately decode the ACK/NACK information bits for each small cell, the small cells may share information on the lengths of the ACK/NACK information bits for each small cell. The small cells may pre-share information on a downlink transmission mode and a TDD uplink-downlink configuration via a wired/wireless link configuring a backhaul.

4.5.3 ACK/NACK Information Bit Fixing Method

Upon simultaneously transmitting ACK/NACK information bits and an SR using PUCCH format 3, the UE may perform encoding by fixing the locations of the ACK/NACK information bits and the SR information bits, as in transmission of only ACK/NACK. A method for fixing the locations of the ACK/NACK information bits and the SR information bits will now be described.

As a first method, encoding may be performed after concatenating the same type of information bits and then concatenating different types of information bits. For example, when two small cells configure the multi-connectivity mode, the UE may perform encoding after concatenating the ACK/NACK information bits of the first small cell+the ACK/NACK information bits of the second small cell+the SR of the first cell+the SR of the second cell in this order, upon configuring PUCCH format 3.

As a second method, encoding may be performed after concatenating the ACK/NACK information and the SR information of one of several small cells and then concatenating the information of another small cell. For example, when two small cells configure the multi-connectivity mode, the UE may perform encoding after concatenating the ACK/NACK information of the first small cell+the SR of the first cell+the ACK/NACK information of the second small cell+the SR of the second cell in this order.

In the above-described methods, when the UE transmits the SR to only the first small cell, the UE may perform encoding except for the SR information bits. For example, when the UE does not transmit the SR to the second small cell, encoding may be performed after padding "0" at the padding location of the SR information bits.

Alternatively, in the above-described methods, when the SR is transmitted to only one small cell (for example, the SR is transmitted to only the first small cell), the UE may perform encoding after concatenating the information bits in order of the ACK/NACK information of the first small cell+the SR information of the first small cell+the ACK/NACK information of the second small cell or in order of the ACK/NACK information of the first small cell+the ACK/NACK information of the second small cell+the SR information of the first small cell.

Alternatively, in the above-described methods, when only the ACK/NACK is transmitted using PUCCH format 3 and the SR is not transmitted, the UE may perform RM encoding after padding "0" at the padding location of the SR information bits.

4.5.4 Power Control Method

Hereinafter, a transmit power setting method for power control when a UE configures PUCCH format 3 to transmit uplink control information as in Chapter 4.5.3 will be described.

4.5.4.1 Method for Setting Transmit Power According to Maximum Values of ACK/NACK Information Bits and SR Information Bits Set in Each Small Cell.

In this method, when the UE individually transmits SR information bits to small cells configuring a multi-connectivity mode, assume that the maximum value of the number of ACK/NACK and SR information bits of the first small cell is n1 and the maximum value of the number of ACK/NACK and SR information bits of the second small cell is n2. At this time, the UE may set the transmit power of the uplink control information in proportion to n1+n2.

Alternatively, when the SR is transmitted to only one of the small cells configuring the multi-connectivity mode, assume that the maximum value of the number of ACK/NACK information bits of the first small cell is n1 and the maximum value of the number of ACK/NACK information bits of the second small cell is n2. At this time, the UE may set the transmit power of the uplink control information in proportion to n1+n2+[1] (included when the SR is transmitted).

4.5.4.2 Method for Setting Transmit Power in Consideration of Maximum Values of ACK/NACK Information Bits and SR Information Bits of Small Cells Other than Serving Cell and ACK/NACK and SR Information Bits Transmitted to Serving Cell When the UE transmits the SR to small cells, assume that the maximum value of the number of ACK/NACK and SR bits of the first small cell is n1, the number of actually transmitted ACK/NACK and SR bits is m2, the maximum value of the number of ACK/NACK and SR bits of the second small cell is n2, and the number of actually transmitted ACK/NACK and SR bits is m2. At this time, the transmit power may be set in proportion to max(n1+m2, n2+m1).

When the UE transmits the SR to one small cell, assume that the maximum value of the number of ACK/NACK information bits of the first small cell is n1 and the number of actually transmitted ACK/NACK information bits is m2. In addition, assume that the maximum value of the number of ACK/NACK information bits of the second small cell is n2 and the number of actually transmitted ACK/NACK information bits is m2. At this time, the transmit power may be set in proportion to max(n1+m2, n2+m1)+[1] (included when the SR is transmitted).

5. Apparatuses

Apparatuses illustrated in FIG. 20 are means that can implement the methods described before with reference to FIGS. 1 to 19.

A UE may act as a transmitter on a UL and as a receiver on a DL. An eNB may act as a receiver on a UL and as a transmitter on a DL.

That is, each of the UE and the eNB may include a Transmission (Tx) module 2040 or 2050 and a Reception (Rx) module 2060 or 2070, for controlling transmission and reception of information, data, and/or messages, and an antenna 2000 or 2010 for transmitting and receiving information, data, and/or messages.

Each of the UE and the eNB may further include a processor 2020 or 2030 for implementing the afore-described embodiments of the present disclosure and a memory 2080 or 2090 for temporarily or permanently storing operations of the processor 2020 or 2030.

The embodiments of the present invention may be performed using the components and functions of the above-described UE and eNB. For example, the processor of the eNB may combine methods disclosed in Chapters 1 to 4 to pre-allocate the uplink channel region for ACK/NACK transmission between the small cells. In addition, the processor of the eNB may control the transmission module to explicitly transmit the resource allocation information of the allocated channel region to the UE using a higher layer signal. The processor of the UE may generate and transmit, to the eNB, one or more of ACK/NACK information bits for PDSCH signals received from two or more small cells, SR information bits for scheduling request and CSI bits for reporting a channel state via an allocated channel region. For a detailed description thereof, refer to Chapters 1 to 4.

The Tx and Rx modules of the UE and the eNB may perform a packet modulation/demodulation function for data transmission, a high-speed packet channel coding function, OFDMA packet scheduling, TDD packet scheduling, and/or channelization. Each of the UE and the eNB of FIG. 20 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 2080 or 2090 and executed by the processor 2020 or 2030. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, a 3GPP2 system, and/or an IEEE 802.xx system. Besides these wireless access systems, the embodiments of the present disclosure are applicable to all technical fields in which the wireless access systems find their applications.

The invention claimed is:

1. A method for transmitting an acknowledgement/negative-acknowledgement (ACK/NACK) signal at a user equipment (UE) in a radio access system supporting a multi-connectivity mode, the method performed by the UE and comprising:
    receiving a higher layer signal including resource allocation information indicating a resource region allocated in order for the UE in the multi-connectivity mode to transmit the ACK/NACK signal;
    receiving a first physical downlink shared channel (PDSCH) from a first small cell;
    receiving a second PDSCH from a second small cell; and
    transmitting the ACK/NACK signal for the first PDSCH and the second PDSCH signal via the resource region indicated by the resource allocation information,
    wherein the UE maintains connection a connection with two or more small cells in the multi-connectivity mode, and
    wherein the resource region is allocated to same time and frequency resources in the first cell and the second cell.

2. The method according to claim 1, wherein the first cell and the second cell are arranged at different physical positions.

3. The method according to claim 2, wherein the ACK/NACK signal is configured by using physical uplink control channel (PUCCH) format 1b.

4. The method according to claim 3, wherein the ACK/NACK signal is combined with a location of the resource region to indicate a result of receiving the first PDSCH and the second PDSCH.

5. The method according to claim 2, wherein the ACK/NACK signal is configured by using a physical uplink control channel (PUCCH) format 3.

6. The method according to claim 5, wherein the UE further transmits scheduling request (SR) information of one or more of the first cell and the second cell by using the PUCCH format 3.

7. The method according to claim 6, wherein the UE configures the PUCCH format 3 by concatenating ACK/NACK information of the first PDSCH ACK/NACK information of the second PDSCH, SR information of the first cell and SR information of the second cell in a fixed order.

8. A user equipment (UE) for transmitting an acknowledgement/negative-acknowledgement (ACK/NACK) signal a-min a radio access system supporting a multi-connectivity mode, the UE comprising:
    a transmitter;
    a receiver; and
    a processor connected to the transmitter and the receiver to support the multi-connectivity mode,
    wherein the processor is configured to:
        receive a higher layer signal including resource allocation information indicating a resource region allocated in order to transmit the ACK/NACK signal,
        receive a first physical downlink shared channel (PDSCH) from a first cell and receive a second PDSCH from a second cell, using the receiver, and
        transmit the ACK/NACK signal for the first PDSCH and the second PDSCH via the resource region indicated by the resource allocation information, using the transmitter,
    wherein the UE maintains a connection with two or more cells in the multi-connectivity mode, and
    wherein the resource region is allocated to same time and frequency resources in the first cell and the second cell.

9. The UE according to claim 8, wherein the first cell and the second cell are arranged at different physical positions.

10. The UE according to claim 9, wherein the ACK/NACK signal is configured by using a physical uplink control channel (PUCCH) format 1b.

11. The UE according to claim 10, wherein the ACK/NACK signal is combined with a location of the resource region to indicate a result of receiving the first PDSCH and the second PDSCH.

12. The UE according to claim 9, wherein the ACK/NACK signal is configured by using a physical uplink control channel (PUCCH) format 3.

13. The UE according to claim 12, wherein the UE further transmits scheduling request (SR) information of one or more of the first cell and the second cell by using the PUCCH format 3.

14. The UE according to claim 13, wherein the UE configures the PUCCH format 3 by concatenating ACK/NACK information of the first PDSCH, ACK/NACK information of the second PDSCH, SR information of the first cell and SR information of the second cell in a fixed order.

* * * * *